US009099239B2

(12) United States Patent
Abe

(10) Patent No.: US 9,099,239 B2
(45) Date of Patent: Aug. 4, 2015

(54) CONTACTLESS POWER SUPPLYING SYSTEM AND METAL FOREIGN OBJECT DETECTION DEVICE OF CONTACTLESS POWER SUPPLYING SYSTEM

(75) Inventor: Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 444 days.

(21) Appl. No.: 13/806,799

(22) PCT Filed: May 20, 2011

(86) PCT No.: PCT/JP2011/061636
§ 371 (c)(1),
(2), (4) Date: Dec. 24, 2012

(87) PCT Pub. No.: WO2012/002063
PCT Pub. Date: Jan. 5, 2012

(65) Prior Publication Data
US 2013/0099592 A1 Apr. 25, 2013

(30) Foreign Application Priority Data
Jun. 30, 2010 (JP) ................................ 2010-148913

(51) Int. Cl.
*H01H 9/54* (2006.01)
*H01F 38/14* (2006.01)
(Continued)

(52) U.S. Cl.
CPC ........ *H01F 38/14* (2013.01); *G01V 3/10* (2013.01); *H02J 5/005* (2013.01); *H02J 7/025* (2013.01); *H02J 17/00* (2013.01)

(58) Field of Classification Search
USPC ................................................ 307/104, 140
See application file for complete search history.

(56) References Cited

U.S. PATENT DOCUMENTS

2008/0200119 A1   8/2008   Onishi et al.
2009/0021219 A1*  1/2009   Yoda et al. ................. 320/137
(Continued)

FOREIGN PATENT DOCUMENTS

EP   2 482 294 A1   8/2012
JP   10-215530 A    8/1998
(Continued)

OTHER PUBLICATIONS

Supplementary European Search Report for corresponding European Application No. 11800532.1 issued Apr. 25, 2014.
(Continued)

*Primary Examiner* — Danny Nguyen
(74) *Attorney, Agent, or Firm* — Renner, Otto, Boisselle & Sklar, LLP

(57) ABSTRACT

A contactless power supplying system, which excites a primary coil of a power supplying device to generate an induced electromotive force at a secondary coil of an appliance arranged on the device and supply the induced electromotive force to a load of the appliance, includes a metal foreign object detection device. The metal foreign object detection device includes an antenna coil, an oscillation circuit, and a detection circuit. The oscillation circuit includes a component having a design value that generates oscillation in a range of oscillation conditions from immediately after the oscillation circuit starts to generate oscillation to just before a stable and continuous oscillation condition. The detection circuit detects a suspension of the oscillation or an attenuation in amplitude of the oscillation based on a change in an electric characteristic of the antenna coil caused by a metal foreign object on the power supplying device.

20 Claims, 17 Drawing Sheets

(51) Int. Cl.
*H02J 5/00* (2006.01)
*G01V 3/10* (2006.01)
*H02J 17/00* (2006.01)
*H02J 7/02* (2006.01)

(56) References Cited

U.S. PATENT DOCUMENTS

| | | |
|---|---|---|
| 2009/0134713 A1 | 5/2009 | Stevens et al. |
| 2010/0013320 A1 | 1/2010 | Shiozaki et al. |
| 2010/0176659 A1* | 7/2010 | Aoyama et al. .......... 307/104 |
| 2011/0285210 A1 | 11/2011 | Lemmens et al. |
| 2011/0291491 A1 | 12/2011 | Lemmens et al. |
| 2012/0146580 A1 | 6/2012 | Kitamura |
| 2012/0175967 A1 | 7/2012 | Dibben et al. |

FOREIGN PATENT DOCUMENTS

| | | |
|---|---|---|
| JP | 3306675 B2 | 5/2002 |
| JP | 3392103 B2 | 1/2003 |
| JP | 2008-206231 A | 9/2008 |
| JP | 2009-219177 A | 9/2009 |
| WO | WO 2009/081115 A1 | 7/2009 |

OTHER PUBLICATIONS

International Search Report for corresponding International Application No. PCT/JP2011/061636 mailed Aug. 16, 2011.

International Preliminary Report on Patentability for corresponding International Application No. PCT/JP2011/061636 issued Feb. 12, 2013.

* cited by examiner

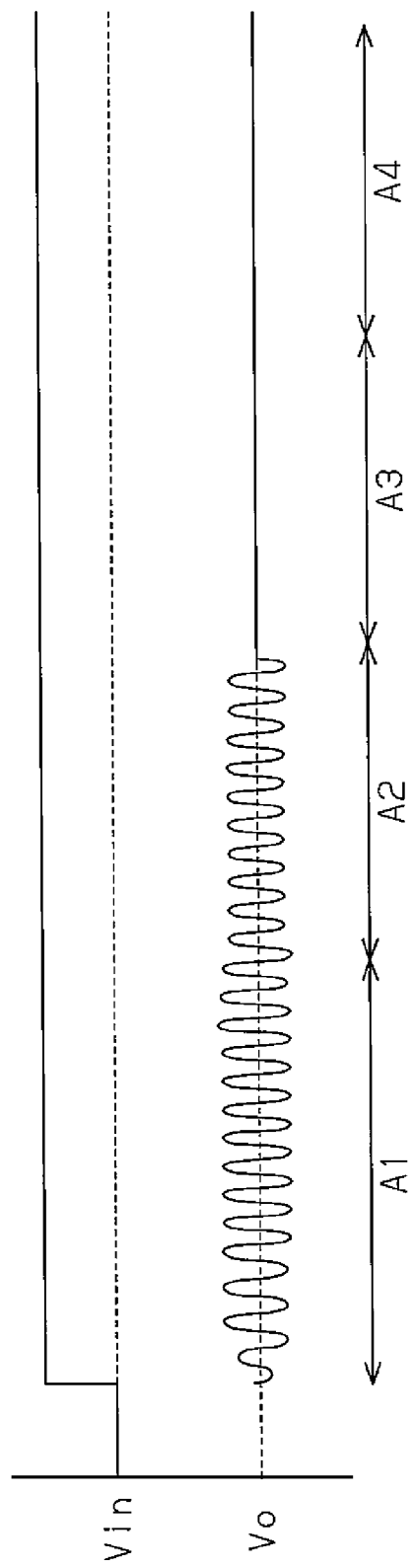

CONTACTLESS POWER SUPPLYING SYSTEM AND METAL FOREIGN OBJECT DETECTION DEVICE OF CONTACTLESS POWER SUPPLYING SYSTEM

TECHNICAL FIELD

The present invention relates to a contactless power supplying system and a metal foreign object detection device of a contactless power supplying system.

BACKGROUND ART

Electromagnetic induction caused by high-frequency magnetic flux is often used to supply power in a contactless manner to cell phones, electric household appliances, and the like. Such electromagnetic induction is used not only for proximity-type electromagnetic induction power supplying that has already been put into practical use but also in spatial power supplying technology, which is referred to as magnetic resonance type power supplying and becoming popular these days. The spatial power supplying technology allows for power supplying over a certain distance.

High-frequency magnetic flux also generates induced electromotive power in a metal foreign object and increases the temperature due to eddy current loss. When the temperature of a metal foreign object becomes high, the housing of a power supplying device or appliance may be deformed. In addition, a user may inadvertently touch the metal foreign object and get hurt.

Several inventions have been proposed to prevent induction heating of such metal object (e.g., Patent Document 1 and Patent Document 2). In the proposed systems, a high-frequency inverter circuit arranged in a power supplying device intermittently oscillates in a standby state. Even when a metal foreign object is solely set during the standby period, the average output is extremely small. Thus, the temperature subtly increases, and the system is safe to use.

When the proper appliance is set, a slight amount of power is transmitted during the intermittent oscillation period to a secondary coil through a primary coil. The secondary side (the appliance side) generates a special signal with the transmitted power and sends back the special signal through an antenna arranged in the power supplying device. By detecting the signal, the power supplying device determines whether or not a proper appliance is set and controls the high-frequency inverter.

Specifically, the power supplying device performs authentication to determine whether or not the appliance is a proper one. Thus, the intermittent oscillation continues when only a metal foreign object is set, and the system is safe to use.

Patent Document 1: Japanese Patent No. 3392103
Patent Document 2: Japanese Patent No. 3306675

DISCLOSURE OF THE INVENTION

A metal foreign object detection device used in a contactless power supplying system obviously has to be able to detect a solely set metal foreign object and also has to be able to detect a thin metal piece and the like arranged between a powering primary coil and a powering secondary coil.

As a method for detecting a metal object arranged between the coils, when signals are transmitted and received between a power supplying unit and an appliance, a reduction in the level of a signal received by the signal receiving side due to attenuation or reflection cased by the sandwiched metal object may be detected. This method uses the mechanism in which the presence of a metal foreign object between transmitting-receiving antennas during the authentication of the appliance attenuates the signal amplitude more than normal at the receiving antenna side.

An another example for detecting such a sandwiched metal foreign object a power supplying coil and a power receiving coil, which transmit power, are used, and the output of the power receiving coil from the appliance side during data transmission is modulated to cause a change in the voltage or current at a terminal of the power supplying coil. This uses the mechanism in which the presence of a metal foreign object between the power receiving coil and the power supplying coil attenuates the signal for data transmission to detect a sandwiched metal object.

However, in these methods, when the metal foreign object is small or thin, the signal attenuation is small. Such attenuation may be determined as a signal level variation of that when no foreign object is present. Thus, a metal foreign object may not be detected. Accordingly, there is a limit to the detection of a sandwiched metal foreign object.

Nowadays, there is a tendency of the power supplying device having a greater output per unit area in order to correspond to high output appliances. Thus, there is greater demand for the detection of smaller and thinner metal pieces. Normally, in order to cope with such a demand, the power supplying system is required to include a costly and complex sensor dedicated to the detection of metal and having high sensitivity and high accuracy. This enlarges the power supplying system and increases costs.

Accordingly, it is an object of the present invention to provide a contactless power supplying system and a metal foreign object detection device for a contactless power supplying system that are capable of detecting a metal foreign object with high sensitivity, high accuracy, and an inexpensive and simplified structure.

A first aspect of the present invention is a contactless power supplying system. The contactless power supplying system is provided with a power supplying device including a primary coil and a high-frequency inverter that applies high-frequency current to the primary coil. An appliance includes a secondary coil that generates an induced electromotive force using an alternate magnetic field generated by the current flowing to the primary coil. The appliance uses the electromotive force generated at the secondary coil to supply power to a load. A metal foreign object detection device includes an antenna coil, an oscillation circuit that applies high-frequency current to the antenna coil, and a detection circuit that detects a change in voltage or current observed at one of the oscillation circuit and the antenna coil. The oscillation circuit includes a component having a design value that generates oscillation in a range of oscillation conditions from immediately after the oscillation circuit starts to generate oscillation to just before a stable and continuous oscillation condition. The metal foreign object detection device detects, with the detection circuit, a suspension of the oscillation of the oscillation circuit or an attenuation in amplitude of the oscillation based on a change in an electric characteristic of the antenna coil caused by a metal foreign object arranged on the power supplying device, and controls the power supplying device.

A second aspect of the present invention is a metal foreign object detection device for a contactless power supplying system that excites a primary coil of a power supplying device to generate an induced electromotive force with electromagnetic induction at a secondary coil of an appliance arranged on the power supplying device and supply the induced electromotive force to a load of the appliance. The metal foreign object detection device includes an antenna coil, an oscillation circuit that applies high-frequency current to the antenna coil, and a detection circuit that detects a change in voltage or current observed at one of the oscillation circuit and the antenna coil. The oscillation circuit includes a component having a design value that generates oscillation in a range of oscillation conditions from immediately after the oscillation circuit starts to generate oscillation to just before a stable and continuous oscillation condition. The detection circuit detects suspension of the oscillation of the oscillation circuit or an attenuation in amplitude of the oscillation based on a change in an electric characteristic of the antenna coil caused by a metal foreign object arranged on the power supplying device, and controls the power supplying device.

The present invention allows for detection of a metal foreign object with high sensitivity, high accuracy, and an inexpensive and simplified structure.

BRIEF DESCRIPTION OF THE DRAWINGS

FIG. 6 is an output waveform diagram showing an oscillation signal of the oscillation circuit.

DESCRIPTION OF THE EMBODIMENTS

A contactless power supplying system according to a first embodiment of the present invention will now be described with reference to the drawings.

Figure 1:
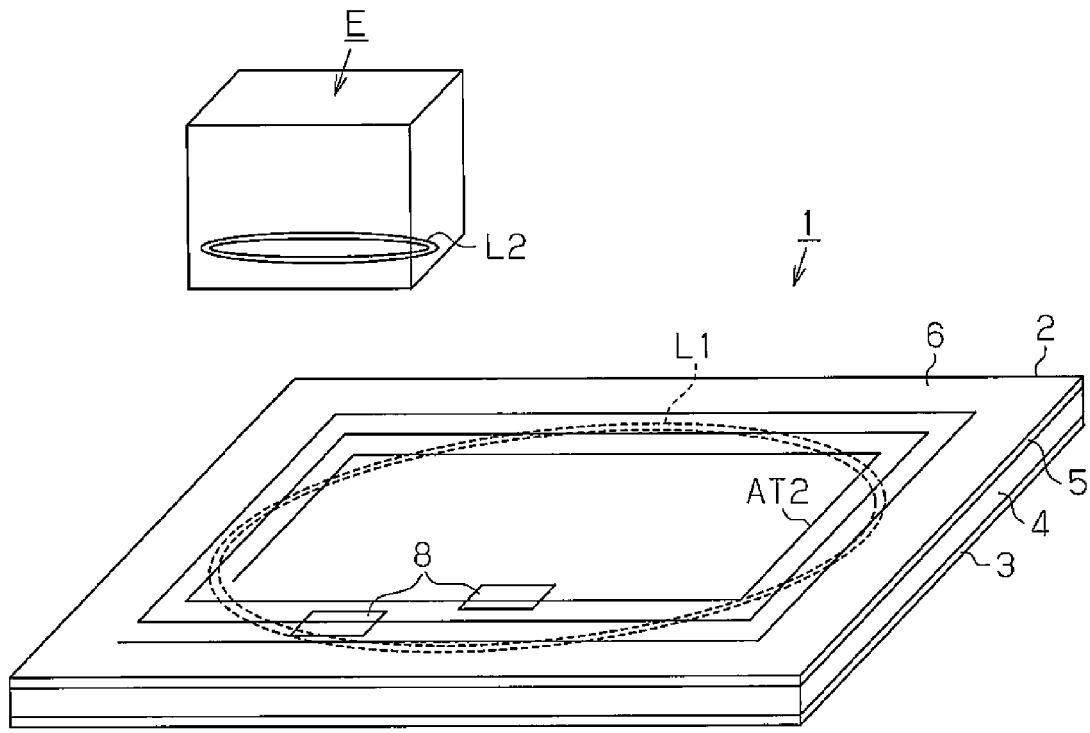
FIG. 1 is an overall perspective view showing a power supplying device according to a first embodiment.

FIG. 1 is an overall perspective view showing a power supplying device 1 and an appliance E supplied with power from the power supplying device 1 in a contactless manner. The power supplying device 1 includes a housing 2 formed by a tetragonal bottom plate 3, a tetragonal frame 4 extending upward from the four sides of the bottom plate 3, and a top plate 5 made of reinforced glass and closing an upper opening of the tetragonal frame 4. The top plate 5 includes an upper surface that defines a setting surface 6, which serves as a power supplying surface on which the appliance E is set.

Figure 2:
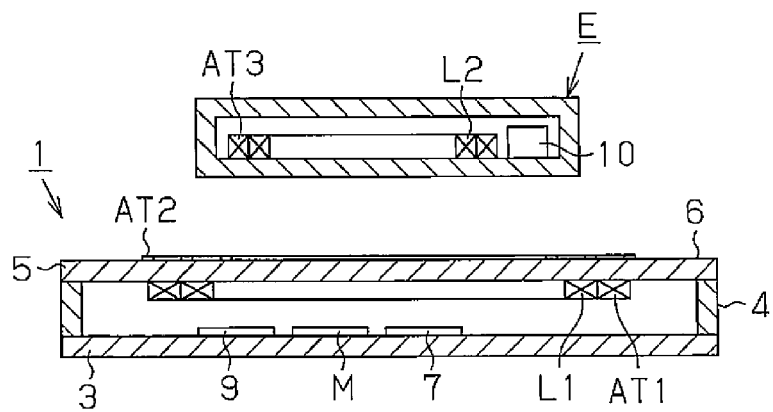
FIG. 2 is a diagram for showing the layout of a primary coil and a metal detection antenna coil.

As shown in FIG. 2, a primary coil L1 is arranged in a cavity (in the housing 2) defined between the bottom plate 3, the tetragonal frame 4, and the top plate 5. In this embodiment, the single primary coil L1 is arranged parallel to the setting surface 6 of the top plate 5. The primary coil L1 is fixed at a position close to a lower surface of the top plate 5 such that the primary coil L1 almost contacts the lower surface of the top plate 5.

A power supplying module M is arranged below the primary coil L1 on the bottom plate 3 to controlling the excitation and driving of the primary coil L1. The power supplying module M is connected to the primary coil L1, drives and excites the primary coil L1, and supplies power in a contactless manner to the appliance E set on the setting surface 6.

As shown in FIG. 2, a signal receiving antenna coil AT1 is fixed at an outer side of the primary coil L1 surrounding the primary coil L1. The appliance E set on setting surface 6 and the power supplying module M exchange data and information through wireless communication via the signal receiving antenna coil AT1.

Further, as shown in FIG. 2, a metal detection antenna coil AT2 is arranged on the upper surface (setting surface 6) of the top plate 5 at a position opposed to the primary coil L1. The spiral metal detection antenna coil AT2 is formed on the setting surface 6 through a known printed wiring technique.

The metal detection antenna coil AT2 is connected to a metal foreign object detection device 7 arranged in the housing 2 and forms part of the metal foreign object detection device 7. The metal foreign object detection device 7 is adapted to detect a metal piece 8 on the setting surface 6 via the metal detection antenna coil AT2. When detecting a metal piece 8 on the setting surface 6, the metal foreign object detection device 7 outputs a metal presence signal ST to the power supplying module M.

The housing 2 accommodates a system controller 9 including a microcomputer that centrally controls the power supplying module M. The data and information received at the signal receiving antenna coil AT1 are output to the system controller 9 via the power supplying module M. The metal presence signal ST detected by the metal detection antenna coil AT2 and output by the metal foreign object detection device 7 is output to the system controller 9 via the power supplying module M.

The appliance E set on the setting surface 6 of the power supplying device 1 includes a secondary coil L2. As shown in FIG. 2, the secondary coil L2 of the appliance E is excited and supplied with power by the excitation of the primary coil L1 of the power supplying device 1, and the supplied power, that is, the secondary power, is supplied to a load Z of the appliance E.

Further, as shown in FIG. 2, a transmitting-receiving antenna coil AT3 is wounded around the outer side of the secondary coil L2 of the appliance E to surround the secondary coil L2. When the appliance E is set on the setting surface 6 of the power supplying device 1, the appliance E and the power supplying module M exchange data and information to controlling the excitation and driving of the primary coil L1 through wireless communication via the signal receiving antenna coil AT1, which surrounds the primary coil L1 positioned immediately below the setting surface 6.

The electric configuration of the power supplying device 1 and the appliance E will now be described with reference to FIG. 3.

Figure 3:
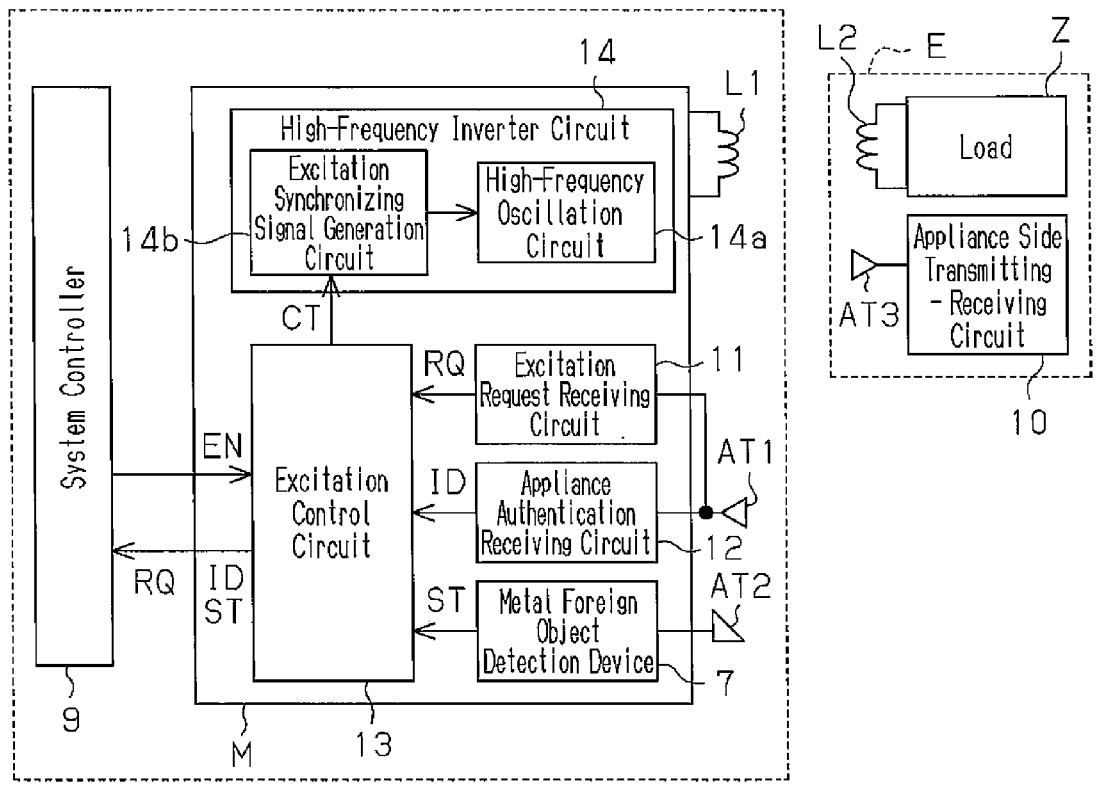
FIG. 3 is an electric circuit block diagram showing the electric configuration of the power supplying device and an appliance.

As shown in FIG. 3, the appliance E includes an appliance side transmitting-receiving circuit 10. The appliance side transmitting-receiving circuit 10 is connected to a transmitting-receiving antenna coil AT3. The appliance side transmitting-receiving circuit 10 produces an appliance authenticating signal ID, which indicates that the appliance E can be supplied with power supply from the power supplying device 1, and an excitation request signal RQ, which is for requesting the power supplying device 1 to supply power. The appliance side transmitting-receiving circuit 10 is adapted to transmit the appliance authenticating signal ID and the excitation request signal RQ to the power supplying device 1 via the transmitting-receiving antenna coil AT3.

The appliance E is driven by the power generated at the secondary coil L2 (secondary power) and required to produce the appliance authenticating signal ID and the excitation request signal RQ, which are described above, and transmit these signals to the power supplying device 1. Accordingly, the appliance E may rectify the secondary power generated at the secondary coil L2 with a rectification circuit and may be driven on the setting surface 6 using the rectified direct current. Alternatively, the appliance E may be driven on the setting surface 6 directly using the secondary power as alternating current power. Alternatively, the appliance E may rectify the secondary power generated at the secondary coil L2 with a rectification circuit to charge a built-in charging battery (secondary battery) with the rectified direct current power.

In an appliance E that charges its built-in secondary battery, such as cell phone or a laptop PC, the appliance side transmitting-receiving circuit 10 may function so that when charging is completed, among the appliance authenticating signal ID and the excitation request signal RQ that have been transmitted until the completion of the charging, the excitation request signal RQ is cancelled, while the appliance authenticating signal ID are continuously transmitted.

When the appliance E includes a timer, the appliance side transmitting-receiving circuit 10 may function so as to drive the appliance E with the supplied power for a time set by the timer, and among the appliance authenticating signal ID and the excitation request signal RQ that have been transmitted until the completion of the charging, cancel the excitation request signal RQ, while continuously transmitting the appliance authenticating signal ID.

As shown in FIG. 3, the power supplying module M connected to the primary coil L1 includes an excitation request receiving circuit 11, an appliance authentication receiving circuit 12, an excitation control circuit 13, and a high-frequency inverter circuit 14.

The excitation request receiving circuit 11, which is connected to the signal receiving antenna coil AT1 of the power supplying module M, receives the transmission signal from the appliance E set on the setting surface 6 via the signal receiving antenna coil AT1. The excitation request receiving circuit 11 extracts, from the received transmission signal, the excitation request signal RQ for requesting the power supply. The excitation request receiving circuit 11, when extracting the excitation request signal RQ from the transmission signal, outputs the extracted excitation request signal RQ to the excitation control circuit 13.

The appliance authentication receiving circuit 12, which is connected to the signal receiving antenna coil AT1 of the power supplying module M, receives the transmission signal from the appliance E set on the setting surface 6 via the signal receiving antenna coil AT1. The appliance authentication receiving circuit 12 extracts, from the received transmission signal, the appliance authenticating signal ID, which indicates that the appliance E can be supplied with power. Then, the appliance authentication receiving circuit 12, when extracting the appliance authenticating signal ID from the transmission signal, outputs the appliance authenticating signal ID to the excitation control circuit 13.

Figure 4:
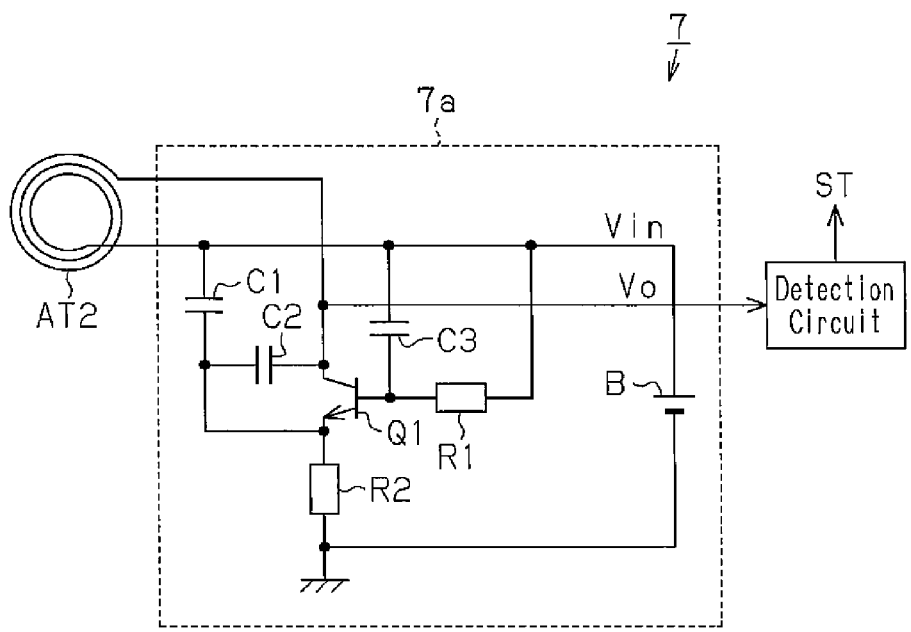
FIG. 4 is an oscillation circuit diagram of a metal foreign object detection device.

The excitation control circuit 13 is connected to the metal foreign object detection device 7. As shown in FIG. 4, the metal foreign object detection device 7 includes an oscillation circuit 7a, which supplies high-frequency current to the metal detection antenna coil AT2, and a detection circuit 7b, which detects changes in the voltage or current (oscillation signal Vo) of the metal detection antenna coil AT2. The metal foreign object detection device 7 detects whether or not a metal piece 8 is set on the setting surface 6 with the metal detection antenna coil AT2 and outputs the metal presence signal ST to the excitation control circuit 13 from the detection circuit 7b when detecting that a metal piece 8 is set on the setting surface 6.

In this embodiment, as shown in FIG. 4, the oscillation circuit 7a, which is formed by a Colpitts oscillation circuit, uses the metal detection antenna coil AT2 as one component of an inductance for the oscillation circuit 7a.

The oscillation circuit 7a includes a bipolar transistor Q1, the metal detection antenna coil AT2, first to third capacitors C1 to C3, and first and second resistors R1 and R2.

The collector terminal of the transistor Q1 is connected to a first end of the metal detection antenna coil AT2. A second end of the metal detection antenna coil AT2 is connected to a positive terminal of a DC power source B. The second end of the metal detection antenna coil AT2 is also connected to the emitter terminal of the transistor Q1 via the first capacitor C1. Further, the second capacitor C2 is connected between the collector terminal and the emitter terminal of the transistor Q1.

Further, the base terminal of the transistor Q1 is connected to the positive terminal of the DC power source B via a parallel circuit including the third capacitor C3 and the first resistor R1. In addition, the emitter terminal of the transistor Q1 is connected to a negative terminal of the DC power source B via the second resistor R2. The oscillation circuit 7a outputs the oscillation signal Vo of the oscillation circuit 7a from the collector terminal of the transistor Q1 to the detection circuit 7b.

In the oscillation circuit 7a configured in this manner, circuit constants are set in advance for the components of the oscillation circuit 7a, that is, the transistor Q1, the metal detection antenna coil AT2, the first to third capacitors C1 to C3, and the first and second resistors R1 and R2, and the oscillation signal Vo is output so that a metal foreign object can be detected with high sensitivity is output.

In detail, the components of the oscillation circuit 7a are set to have design values that generate oscillation in a range of oscillation conditions from a state immediately after the oscillation circuit 7a starts to generate oscillation as the oscillation circuit 7a is driven and exceeds a limit value of no oscillation generation to a state just before the oscillation amplitude reaches a stable and maximum amplitude in the oscillation circuit 7a.

In this manner, the design values for the oscillation circuit 7a are not set at values that allow for continuous oscillation to be maintained at stable oscillation amplitudes. Rather, the design values are set at values that capable of generating oscillation in a range of oscillation conditions from immediately after oscillation can be generated to just before a stable and continuous oscillation condition. As a result, a small change in an electromagnetic parameter related to oscillation can cause a large change in the oscillation amplitude of the oscillation signal Vo.

In other words, the electric characteristics of the metal detection antenna coil AT2 in the oscillation circuit 7a are changed by the metal piece 8 set on the setting surface 6 of the power supplying device 1. By using the change in the electric characteristics of the metal detection antenna coil AT2, the oscillation of the oscillation circuit 7a is suspended or the oscillation amplitude of the oscillation signal Vo is greatly attenuated.

FIGS. 5(a) to 5(e) show the setting surface 6 of the power supplying device 1 in different states.

Figure 5A:
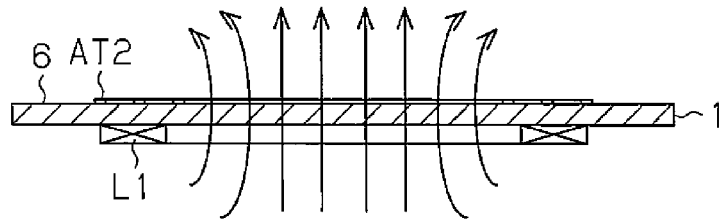
FIG. 5(a) is a diagram showing a state in which nothing is set on the power supplying device.

FIG. 5(a) shows a state in which nothing is set on the setting surface of the power supplying device 1.

Figure 5B:
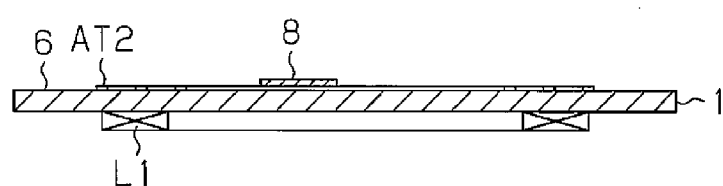
FIG. 5(b) is a diagram showing a state in which only a metal piece is set on the power supplying device.

FIG. 5(b) shows a state in which only a metal piece 8 is set on the setting surface 6 of the power supplying device 1.

Figure 5C:
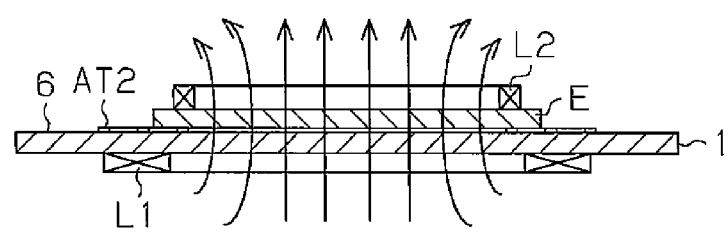
FIG. 5(c) is a diagram showing a state in which only an appliance is set on the power supplying device.

FIG. 5(c) shows a state in which only the appliance E is set on the setting surface 6 of the power supplying device 1.

Figure 5D:
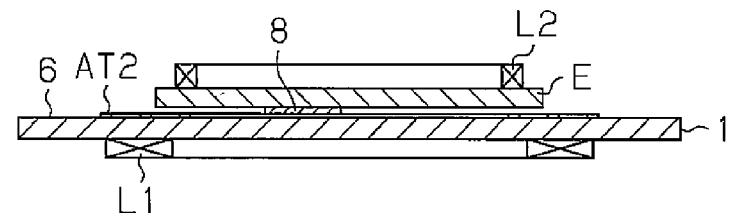
FIG. 5(d) is a diagram showing a state in which a metal piece is arranged between a setting surface of the power supplying device and the appliance.

FIG. 5(d) shows a state in which a metal piece 8 is arranged between the setting surface 6 of the power supplying device 1 and the appliance E.

Figure 5E:
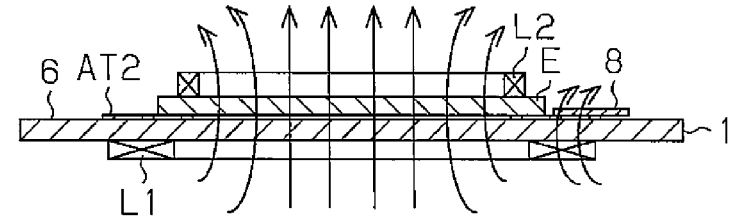
FIG. 5(e) is a diagram showing a state in which a metal piece is set at a position separated from the appliance.

FIG. 5(e) shows a state in which a metal piece 8 is set on the setting surface 6 of the power supplying device 1 at a position separated from the appliance E.

In each state, when nothing is set on the setting surface 6 as shown in FIG. 5(a), the oscillation signal Vo of the oscillation circuit 7a is required to have the waveform of the maximum amplitude as indicated by time period A1 in FIG. 6. Based on this assumption, the amplitude of the oscillation signal Vo is required to become zero as indicated by time period A3 in FIG. 6 when the setting surface 6 is in the state shown in FIG. 5(b). When the setting surface 6 is in the state shown in FIG. 5(c), the oscillation signal Vo is required to have an amplitude waveform that is slightly smaller than that of the maximum amplitude when nothing is set on the setting surface 6 as indicated by time period A2 in FIG. 6.

Further, in the states shown in FIGS. 5(d) and 5(e), the amplitude of the oscillation signal Vo is required to become zero as indicated by time period A4 in FIG. 6.

Thus, in this embodiment, as described above, the design values for the components of the oscillation circuit 7a are intentionally set, by changing the values or the types of the components, to values proximal to conditions at which oscillation just about starts. This realizes the oscillation signal Vo of the oscillation circuit 7a.

In the oscillation circuit 7a, the amplitude of the oscillation signal Vo is subtly attenuated when only the appliance E is set. In contrast, the oscillation is suspended when only the metal piece 8 is set or when the metal piece 8 is arranged between the appliance E and the setting surface 6 or in the vicinity of the appliance E.

Between the appliance E and the metal detection antenna coil AT2, the distance from the metal piece 8 to the metal detection antenna coil AT2 is small. However, even a slight difference in the distance would affect whether or not to generate the oscillation.

In other words, the oscillation circuit 7a is a sensor that is highly sensitive to distance and can accurately detect a metal piece 8 located in the proximity of or in contact with the appliance E at a distance smaller than the thickness of the housing of the appliance E.

When the metal piece 8 is present, the appliance E of which the housing has a certain thickness cannot contact the metal detection antenna coil AT2. This allows for detection of a metal piece 8 to be clearly distinguished from the appliance E that accommodates the secondary coil L2, metal, and a magnetic body in its housing.

As a result, by selecting design values for the oscillation circuit 7a at values in the proximity of conditions at which oscillation just about starts, a significantly high sensitivity is realized with respect to the change in the electromagnetic characteristics caused by a metal piece 8 set proximal to the upper side of the metal detection antenna coil AT2.

In an actual circuit, the characteristics related to the wire inductance and capacitance and the gain of the employed transistors resulting from high-frequency behaviors affect the oscillation condition in a complicated manner. Thus, in this embodiment, after varying the parameters of the components within a certain range through experiments and the like, the parameters are combined, and the design values for the components are set after checking that the oscillation is stable.

The design values for the components of the oscillation circuit 7a may be set to further stabilize oscillation.

Figure 7:
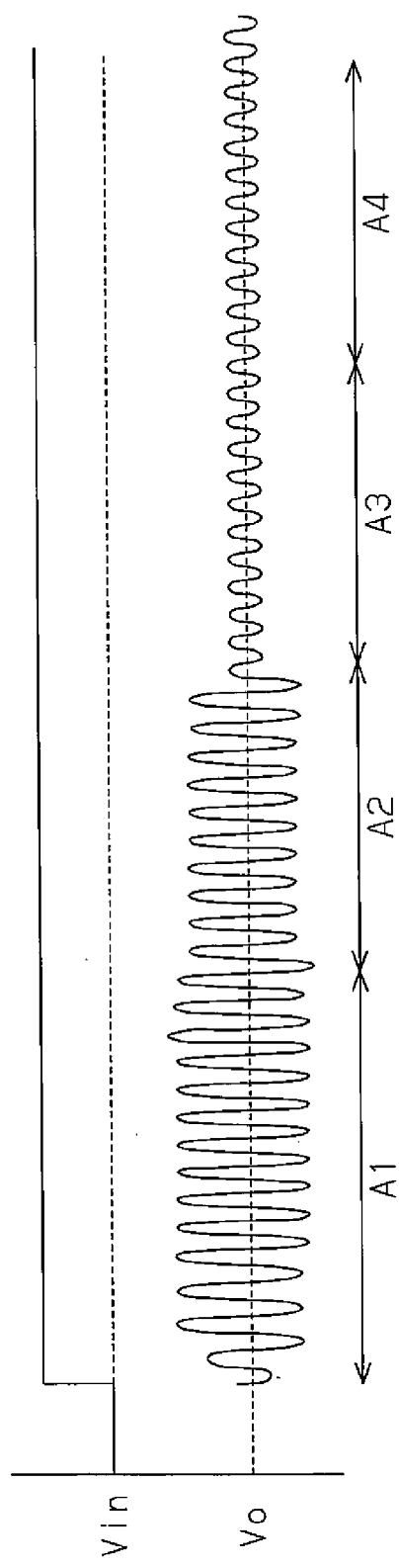
FIG. 7 is an output waveform diagram showing a detection signal of the oscillation circuit under a different oscillation condition.

In this manner, the oscillation signal Vo shown in FIG. 7 is obtained in each of the states of FIGS. 5(a) to 5(e). When only a metal piece 8 was present on the setting surface 6, when a piece 8 was arranged between the appliance E and the setting surface 6, and when a metal piece 8 was located in the vicinity of the appliance E, although oscillation was not suspended, a significant attenuation in the amplitude of the oscillation signal Vo was observed.

The oscillation signal Vo from the oscillation circuit 7a is output to the detection circuit 7b. When the amplitude value of the oscillation signal Vo is less than a predetermined reference value, the detection circuit 7b outputs the metal presence signal ST determining that only a metal piece 8 is placed on the setting surface 6, a metal piece 8 is arranged between the setting surface 6 and the appliance E, or a metal piece 8 is placed on the setting surface 6 in the vicinity of the appliance E. The detection circuit 7b (the metal foreign object detection device 7) outputs this metal presence signal ST to the excitation control circuit 13.

In contrast, when the amplitude value of the oscillation signal Vo is greater than or equal to the predetermined reference value, the detection circuit 7b (the metal foreign object detection device 7) determines that nothing is placed on the setting surface 6 or that only the appliance E is placed on the setting surface 6, and the detection circuit 7b does not output the metal presence signal ST to the excitation control circuit 13.

The excitation control circuit 13 inputs the presently output excitation request signal RQ from the excitation request receiving circuit 11, appliance authenticating signal ID from the appliance authentication receiving circuit 12, and metal presence signal ST from the metal foreign object detection device 7. The excitation control circuit 13 outputs to the system controller 9 the presently input excitation request signal RQ, appliance authenticating signal ID, and metal presence signal ST. Then, the excitation control circuit 13 outputs the excitation request signal RQ, the appliance authenticating signal ID, and the metal presence signal ST to the system controller 9 and waits for a permission signal EN from the system controller 9.

The system controller 9 outputs the permission signal EN to the excitation control circuit 13 to excite and drive the primary coil L1 connected to the power supplying module M, when (1) the excitation request signal RQ is input and (2) the appliance authenticating signal ID is input. When the permission signal EN receives from the system controller 9, the excitation control circuit 13 outputs a drive control signal CT to the high-frequency inverter circuit 14 to excite and drive the primary coil L1 to supply power.

Even if conditions (1) and (2) are satisfied, when the metal presence signal ST is input from the metal foreign object detection device 7 via the excitation control circuit 13, the system controller 9 does not output the permission signal EN. Accordingly, the excitation control circuit 13 does not output the drive control signal CT to the high-frequency inverter circuit 14 to excite and drive the primary coil L1.

Further, when at least one of the excitation request signal RQ and the appliance authenticating signal ID is not input to the system controller 9 from the excitation control circuit 13, the system controller 9 suspends the output of the permission signal EN. Accordingly, in this case, the excitation control circuit 13 does not output the drive control signal CT to the high-frequency inverter circuit 14.

The high-frequency inverter circuit 14 is connected to the primary coil L1 of the power supplying module M. Further, the high-frequency inverter circuit 14 excites and drives the primary coil L1 based on the drive control signal CT.

In this manner, when the drive control signal CT is input from the excitation control circuit 13, the high-frequency inverter circuit 14 excites and drives the primary coil L1 to supply power.

Accordingly, when the appliance E that can be supplied with power from the power supplying device 1 is set on the setting surface 6 and the appliance authenticating signal ID and the excitation request control RQ are transmitted from the appliance E, if there is no metal piece 8 on the setting surface 6, the primary coil L1 is excited and driven by the high-frequency inverter circuit 14 to supply power. In other words, the primary coil L1 is excited and driven so as to supply secondary power to the appliance E in a contactless manner.

As shown in FIG. 3, the high-frequency inverter circuit 14 includes a high-frequency oscillating circuit 14a and an excitation synchronizing signal generation circuit 14b. The high-frequency oscillating circuit 14a is connected to the primary coil L1 to excite and drive the primary coil L1.

Figure 8:
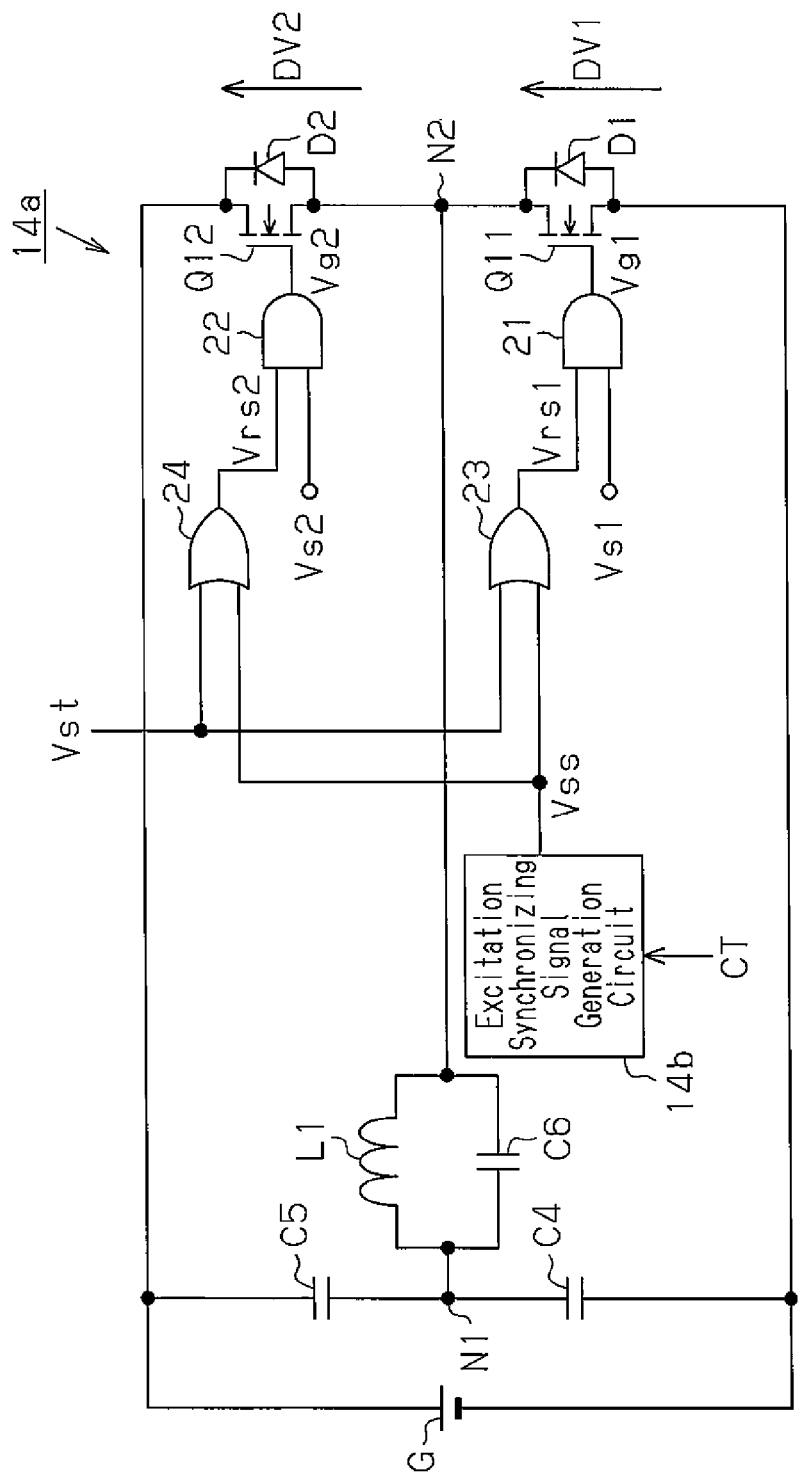
FIG. 8 is a circuit diagram of a high-frequency inverter circuit.

FIG. 8 shows the circuit configuration of the high-frequency oscillating circuit 14a.

The high-frequency oscillating circuit 14a, which is a half bridge partial resonance circuit, includes a voltage-dividing circuits arranged in parallel between a source voltage G arranged in the power supplying device 1 and the ground and formed by a series circuit of a fourth capacitor C4 and a fifth capacitor C5. A drive circuit, which is connected in parallel to the voltage-dividing circuit, includes a series circuit of a first power transistor Q11 and a second power transistor Q12. The first power transistor Q11 and the second power transistor Q12, which are formed by MOSFETs in this embodiment, flywheel diodes D1 and D2 are respectively connected between the source and drain terminals.

The primary coil L1 is connected between a connecting point of the fourth capacitor C4 and the fifth capacitor C5 (node N1) and a connecting of the first power transistor Q11 and the second power transistor Q12 (node N2). A sixth capacitor C6 is connected in parallel to the primary coil L1.

In this embodiment, the first power transistor Q11 and the second power transistor Q12 are formed by N-channel MOSFETs. A first AND circuit 21 is connected to the terminal of the first power transistor Q11, and a second AND circuit 22 is connected to the gate terminal of the second power transistor Q12.

The first AND circuit 21 is an AND circuit having two input terminals. One of the two input terminals receives a first excitation synchronizing signal Vs1, which is a high-low signal.

Figure 9:
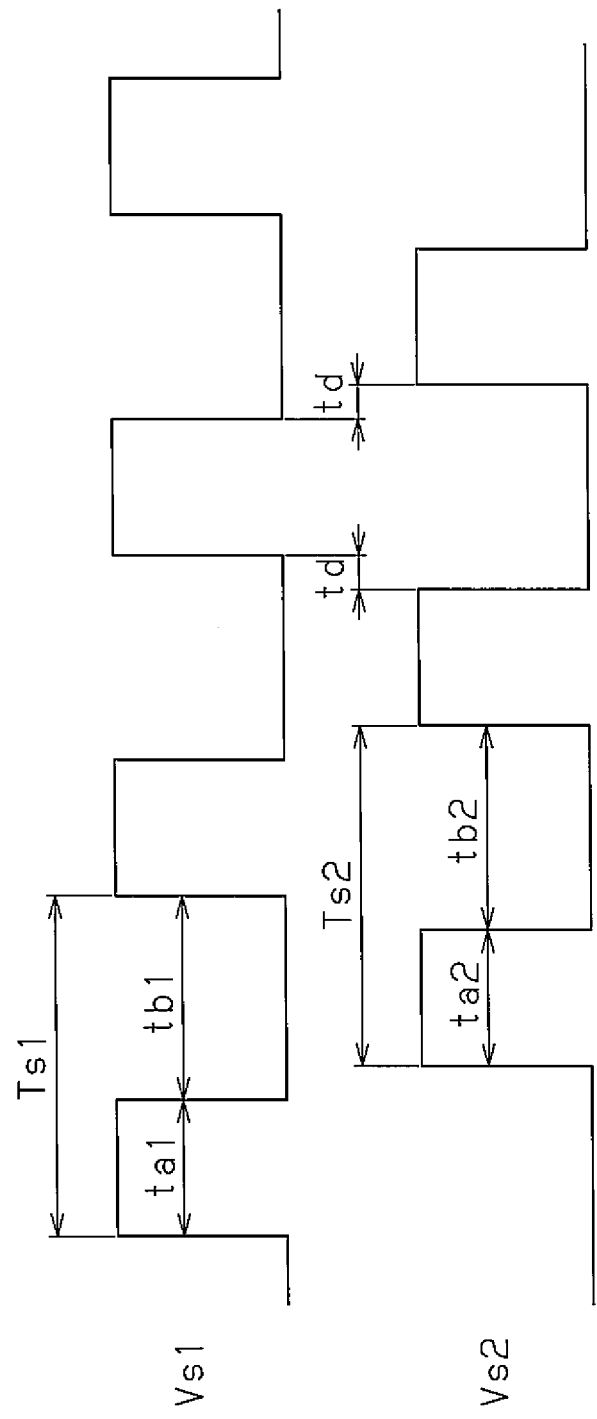
FIG. 9 is an output waveform diagram showing a first excitation synchronizing signal and a second excitation synchronizing signal.

In detail, the first excitation synchronizing signal Vs1 is a high-low signal having a predetermined cycle Ts1, in which a high time ta1 is set to be shorter than a low time tb1 as shown in FIG. 9. In this embodiment, the first excitation synchronizing signal Vs1 is output from a signal generation circuit (not shown) arranged in the system controller 9.

The other input terminal of the first AND circuit 21 receives a first output signal Vrs1 from a first OR circuit 23.

The first OR circuit 23 is an OR circuit having two input terminals. One of the input terminals receives an intermittent high signal Vst, which intermittently shifts to a high level as shown in FIG. 10.

Figure 10:
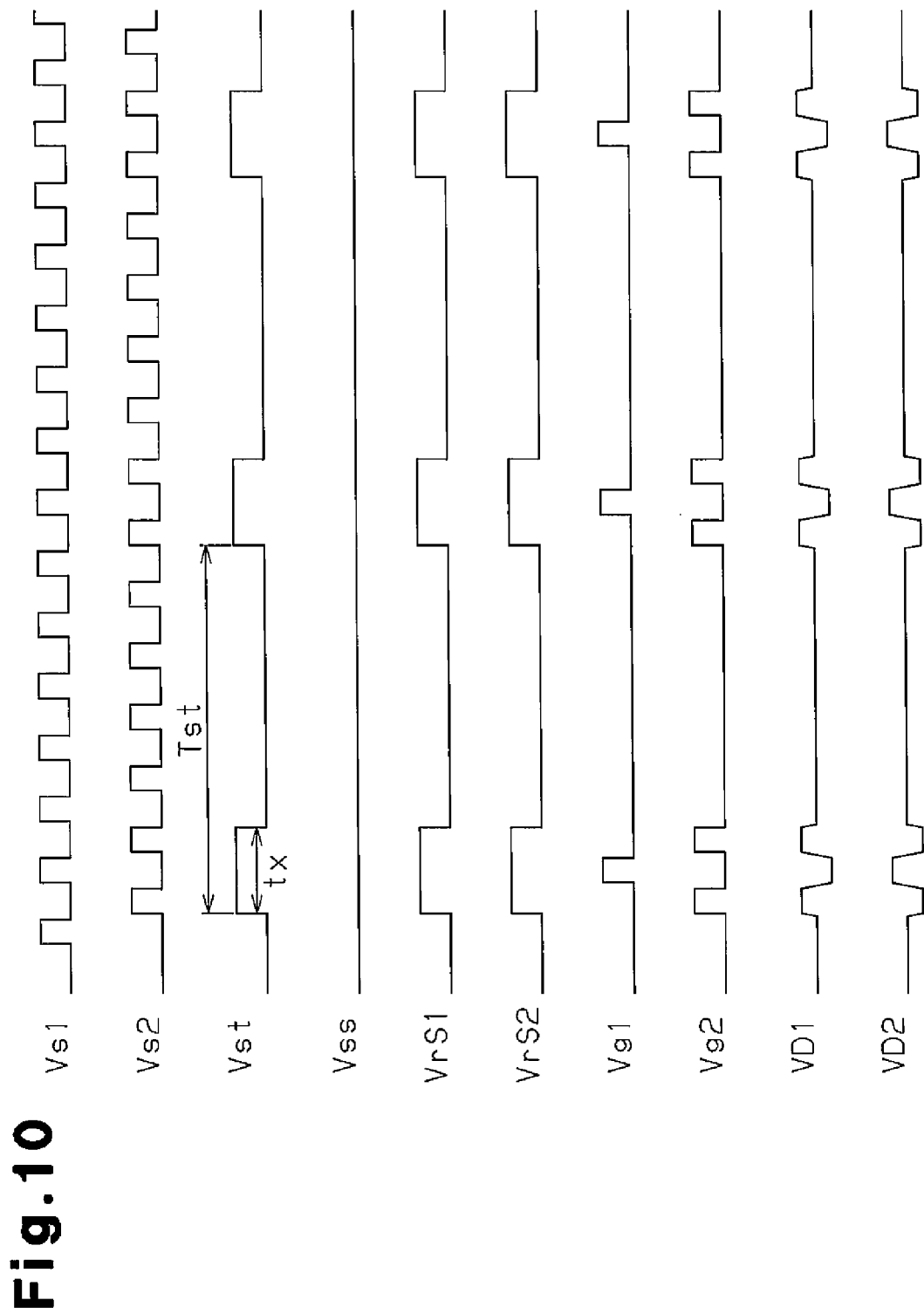
FIG. 10 is an output waveform diagram showing the output of the high-frequency inverter circuit.

In detail, the intermittent high signal Vst in this embodiment has a cycle Tst that is six times longer than the cycle Ts1 of the first excitation synchronizing signal Vs1 (=6 Ts1), as shown in FIGS. 9 and 10. The intermittent high signal Vst rises to a high level after the first excitation synchronizing signal Vs1 falls from a high level to a low level. After rising to a high level, the intermittent high signal Vst falls to a low level just before a second one of the first excitation synchronizing signal Vs1 rises. Then, after the intermittent high signal Vst falls, the intermittent high signal Vst next rises to a high level after a fifth one of the first excitation synchronizing signal Vs1 falls. The time during which the intermittent signal Vst has a high level is referred to as high time tx.

In this embodiment, the intermittent high signal Vst is output from a signal generation circuit (not shown) arranged in the system controller 9.

Figure 11:
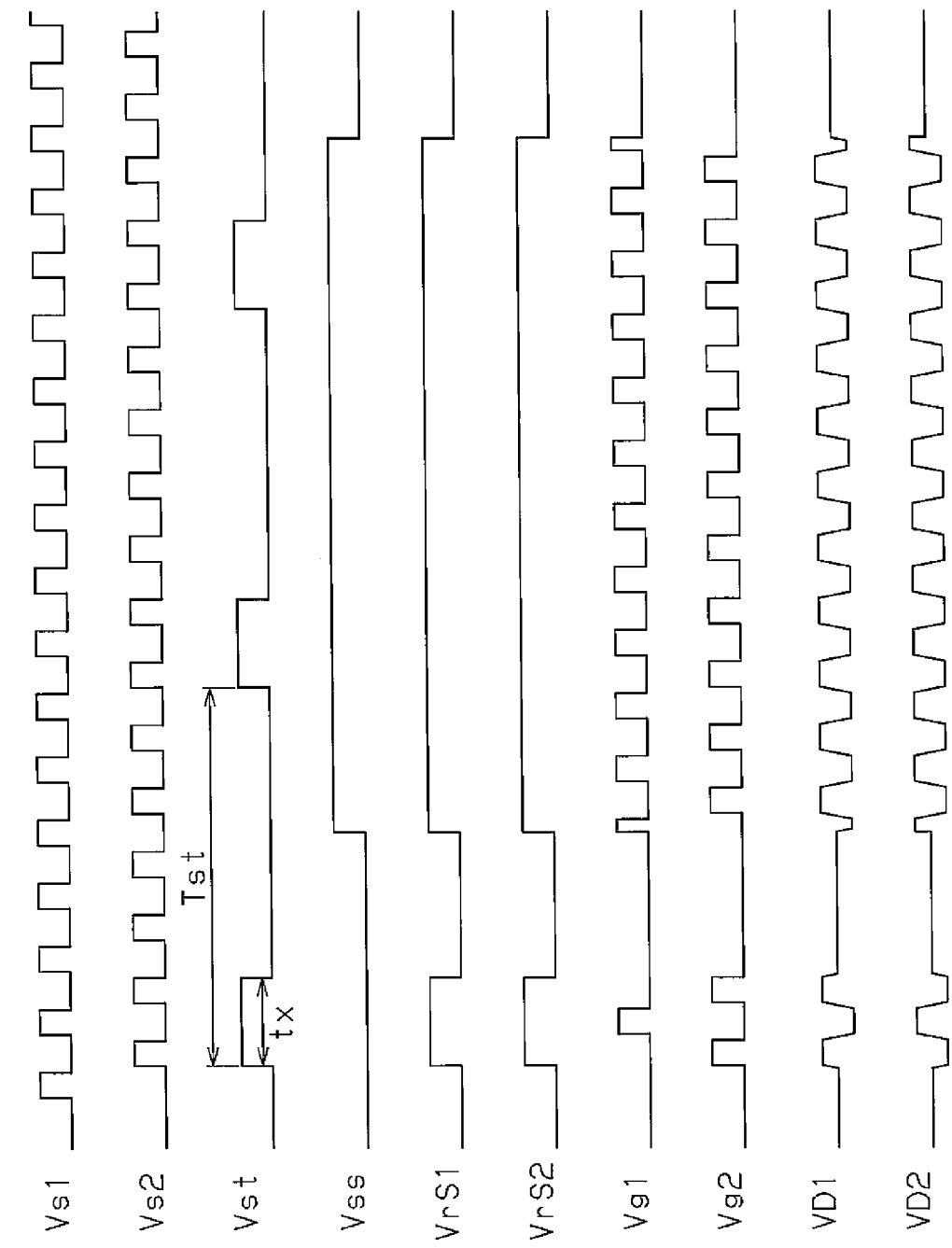
FIG. 11 is an output waveform diagram showing the output of the high-frequency inverter circuit.

The other input terminal of the first OR circuit 23 receives an inverter control signal Vss as shown in FIGS. 10 and 11 from the excitation synchronizing signal generation circuit 14b.

The excitation synchronizing signal generation circuit 14b outputs a high-level inverter control signal Vss to the first OR circuit 23 to excite and drive the primary coil L1, which supplies power, when the drive control signal CT is input from the excitation control circuit 13.

When no drive control signal CT is input to the excitation synchronizing signal generation circuit 14b from the excitation control circuit 13, the excitation synchronizing signal generation circuit 14b does not output the high-level inverter control signal Vss.

For instance, when the appliance E is not set on the setting surface 6 (when the excitation request signal RQ and the appliance authenticating signal ID are not received), the excitation synchronizing signal generation circuit 14b does not output the high-level inverter control signal Vss to the first OR circuit 23. Here, the first OR circuit 23 outputs the first output signal Vrs1 at a high level to the subsequent first AND circuit 21 for the same time as the high time tx in each cycle Tst of the intermittent high signal Vst, which is input to one of its input terminals. In other words, the first OR circuit 23 in this state outputs the intermittent high signal Vst as the first output signal Vrs1.

Accordingly, as shown in FIG. 10, when the intermittent high signal Vst is input, the first AND circuit 21 outputs the first excitation synchronizing signal Vs1 as a first on-off signal Vg1 to the gate of the first power transistor Q11 during each cycle Tst. As a result, the first power transistor Q11 is intermittently turned on in response to the first on-off signal Vg1 (the first excitation synchronizing signal Vs1) during the high time tx of the intermittent high signal Vst in each cycle Tst.

When the metal piece 8 is not set and the above conditions (1) and (2) are satisfied, the excitation synchronizing signal generation circuit 14b receives the drive control signal CT and outputs the high-level inverter control signal Vss to the first OR circuit 23. Then, the first OR circuit 23 outputs the high-level inverter control signal Vss as the first output signal Vrs1 to the subsequent first AND circuit 21.

Accordingly, as shown in FIG. 11, when the high-level inverter control signal Vss is being output, the first AND circuit 21 outputs the first excitation synchronizing signal Vs1 as the first on-off signal Vg1 to the gate of the first power transistor Q11 in the predetermined cycle Ts1. As a result, the first power transistor Q11 is turned on and off in the cycle Ts1 of the first excitation synchronizing signal Vs1.

The gate terminal of the second power transistor Q12 is connected to a second AND circuit 22. The second AND circuit 22 is an AND circuit having two input terminals. One of the input terminals receives a second excitation synchronizing signal Vs2, which is a high-low signal.

In detail, the second excitation synchronizing signal Vs2 is a high-low signal having a predetermined cycle Ts2, which is the same as the cycle Ts1 of the first excitation synchronizing signal Vs1 as shown in FIG. 9. In the same manner as the first excitation synchronizing signal Vs1, the second excitation synchronizing signal Vs2 is set so that a high time ta2 (=ta1) is shorter than a low time tb2 (=tb1) and so that the first excitation synchronizing signal Vs1 is substantially inverted.

Specifically, when the first synchronizing signal Vs1 is high, the second synchronizing signal Vs2 is low, and when the first synchronizing signal Vs1 is low, the second synchronizing signal Vs2 is high.

Further, as described above, in the first and second excitation synchronizing signals Vs1 and Vs2, the high times Ta1 and Ta2 are respectively set to be shorter than the low times tb1 and tb2. Thus, during the time period from when the first excitation synchronizing signal Vs1 falls from a high level to a low level and the second excitation synchronizing signal Vs2 rises from a low level to a high level, and during the time period when the second excitation synchronizing signal Vs2 falls from a high level to a low level and the first excitation synchronizing signal Vs1 rises from a low level to a high level, there is a dead time td during which the first and second excitation synchronizing signals Vs1 and Vs2 both have a low level. This dead time td allows for soft switching of the first power transistor Q11 and the second power transistor Q12.

In this embodiment, the second excitation synchronizing signal Vs2 is output from a signal generation circuit (not shown) arranged in the system controller 9.

In addition, the other input terminal of the second AND circuit 22 receives a second output signal Vrs2 from a second OR circuit 24.

The second OR circuit 24 is an OR circuit having two input terminals. One of the input terminals receives the above intermittent high signal Vst. In the same manner, the other input terminal of the second OR circuit 24 receives the inverter control signal Vss from the excitation synchronizing signal generation circuit 14b.

Accordingly, when the drive control signal CT is input to the excitation synchronizing signal generation circuit 14b from the excitation control circuit 13 (when the above conditions (1) and (2) are satisfied), the second OR circuit 24 receives the high-level inverter control signal Vss.

Also, when the excitation synchronizing signal generation circuit 14b does not receive the drive control signal CT from the excitation control circuit 13 (when the conditions (1) and (2) are not satisfied), the second OR circuit 24 does not receive the high-level inverter control signal Vss.

Then, the second OR circuit 24 outputs to the subsequent second AND circuit 22 the second output signal Vrs2 that is shifted to a high level for the same time as the high time tx in each cycle Tst of the intermittent high signal Vst, which is input to one of its input terminals. In other words, in this state the second OR circuit 24 outputs the intermittent high signal Vst as the second output signal Vrs2.

Accordingly, as shown in FIG. 10, when the intermittent high signal Vst is being input, the second AND circuit 22 outputs the second excitation synchronizing signal Vs2 as a second on-off signal Vg2 to the gate of the second power transistor Q12 during each cycle Tst. As a result, in response to the second on-off signal Vg2 (second excitation synchronizing signal Vs2), the second power transistor Q12 is intermittently turned on during the high time tx of the intermittent high signal Vst in each cycle Tst.

For instance, when the appliance E is not set on the setting surface 6 (when the excitation request signal RQ and the appliance authenticating signal ID are not received), the first power transistor Q11 of the high-frequency oscillation circuit 14a is turned on and off by the first excitation synchronizing signal Vs1, which is determined by the intermittent high signal Vst, and the second power transistor Q12 is turned on and off by the second excitation synchronizing signal Vs2, which is determined by the intermittent high signal Vst.

The waveform of the first excitation synchronizing signal Vs1 is inverted from the waveform of the second excitation synchronizing signal Vs2. Thus, the first power transistor Q11 and the second power transistor Q12 are alternately and intermittently turned on and off. This intermittently excites and drives the primary coil L1.

Accordingly, in a standby state in which the appliance E is not set on the setting surface 6, the primary coil L1 of the power supplying device 1 is not continuously excited but intermittently excited and driven.

When the metal piece 8 is not set and the above conditions (1) and (2) are satisfied, the excitation synchronizing signal generation circuit 14b outputs the high-level inverter control signal Vss to the second OR circuit 24. Then, the second OR circuit 24 outputs the high-level inverter control signal Vss as the second output signal Vrs2 to the subsequent second AND circuit 22.

Accordingly, as shown in FIG. 11, when the high-level inverter control signal Vss is being output, the second AND circuit 22 outputs the second excitation synchronizing signal Vs2 having the predetermined cycle Ts2 as the second on-off signal Vg2 to the gate of the second power transistor Q12. As a result, the second power transistor Q12 is turned on and off in the cycle Ts2 of the second excitation synchronizing signal Vs2.

Thus, when the metal piece 8 is not set and the above conditions (1) and (2) are satisfied, that is, when the high-level inverter control signal Vss is output, the first power transistor Q11 is turned on and off by the first excitation synchronizing signal Vs1, and the second power transistor Q12 is turned on and off by the second excitation synchronizing signal Vs2.

The waveforms of the first and second excitation synchronizing signals Vs1 and Vs2 respectively output as the first and second on-off signals Vg1 and Vg2 are inverted from each other. Thus, when the conditions (1) and (2) are satisfied, the first power transistor Q11 and the second power transistor Q12 of the high-frequency oscillation circuit 14a are alternately turned on and off.

The excitation voltages VD1 and VD2 are generated between the source and drain of the first power transistor Q11 and the second power transistor Q12, respectively.

Accordingly, when the appliance E is set on the setting surface 6 of the power supplying device 1 to supply power, the primary coil L1 located where the appliance E is set is continuously excited and driven.

The system controller 9, which includes the microcomputer, is electrically connected to the power supplying module M. As described above, the system controller 9 receives the excitation request signal RQ, the appliance authenticating signal ID, and the metal presence signal ST from the excitation control circuit 13. Then, the system controller 9 determines whether or not the appliance E that is requesting for the power supply is set based on the excitation request signal RQ and the appliance authenticating signal ID from the excitation control circuit 13.

When the excitation request signal RQ and the appliance authenticating signal ID are input from the excitation control circuit 13, the system controller 9 outputs the permission signal EN to the excitation control circuit 13. In other words, the system controller 9 determines that the appliance E, which is requesting for the power supply, is set and outputs the permission signal EN to the excitation control circuit 13.

Further, the system controller 9 determines whether or not the metal piece 8 is set on the setting surface 6 based on the metal presence signal ST output from the metal foreign object detection device 7 via the excitation control circuit 13. When the metal presence signal ST is input from the excitation control circuit 13, the system controller 9 does not output the permission signal EN to the excitation control circuit 13. In other words, the system controller 9 determines that a metal piece 8 is on the setting surface 6 and does not output the permission signal EN to the excitation control circuit 13.

Accordingly, even when the appliance E requesting for the power supply is set on the setting surface 6 of the power supplying device 1 and the power supplying device 1 can be supplied with power, the system controller 9 does not output the permission signal EN if a metal piece 8 is on the setting surface 6 in the states shown in FIGS. 5(d) and (e). This prevents induction heating of the metal piece 8.

As described above, the system controller 9 includes a signal generation circuit (not shown) that generates the first excitation synchronizing signal Vs1, the second excitation synchronizing signal Vs2, and the intermittent high signal Vst. When a power switch (not shown) of the power supplying device 1 is turned on, the system controller 9 drives the signal generation circuit to generate the first excitation synchronizing signal Vs1, the second excitation synchronizing signal Vs2, and the intermittent high signal Vst. Then, the system controller 9 outputs each of the generated first excitation synchronizing signal Vs1, second excitation synchronizing signal Vs2, and intermittent high signal Vst to the high-frequency inverter circuit 14 of the power supplying module M.

Accordingly, when no permission signal EN is input to the power supplying module M (for instance, in a standby state), the high-frequency inverter circuit 14 of the power supplying module M continuously receives the first excitation synchronizing signal Vs1, the second excitation synchronizing signal Vs2, and the intermittent high signal Vst. Thus, the primary coil L1 of the power supplying device 1 is not continuously excited but intermittently excited and driven.

The operation of the power supplying device 1 will now be described.

When the power switch (not shown) is turned on and the power supplying device 1 is supplied with power, the system controller 9 outputs the first excitation synchronizing signal Vs1, the second excitation synchronizing signal Vs2, and the intermittent high signal Vst to the high-frequency inverter circuit 14 to intermittently excite and drive the primary coil L1.

As a result, the high-frequency inverter circuit 14 of the power supplying module M intermittently excites the primary coil L1. Then, the system controller 9 waits for the excitation request signal RQ and appliance authenticating signal ID from the power supplying module M and continues the intermittent excitation of the primary coil L1 until the excitation request signal RQ and the appliance authenticating signal ID from the power supplying module M are input. Here, the power supplying module is in the standby state.

When the appliance E is set, the appliance E obtains a slight amount of the secondary power from the intermittent excitation of the primary coil L1 in the power supplying device 1 and activates the appliance side transmitting-receiving circuit 10. The appliance E generates the appliance authenticating signal ID and the excitation request signal RQ with the appliance side transmitting-receiving circuit 10 and transmits the signals to the signal receiving antenna coil AT1 of the power supplying module M via the transmitting-receiving antenna coil AT3.

Then, when the signal receiving antenna coil AT1 receives the appliance authenticating signal ID and the excitation request signal RQ from the appliance E, the excitation request signal RQ is extracted with the excitation request receiving circuit 11 and the appliance authenticating signal ID is extracted with the appliance authentication receiving circuit 12. The extracted excitation request signal RQ and device authenticating signal ID are provided to the system controller 9 via the excitation control circuit 13.

The system controller 9 determines that the appliance E requesting for power to be supplies is set based on the excitation request signal RQ and device authenticating signal ID from the excitation control circuit 13 and outputs the permission signal EN to the excitation control circuit 13.

In response to the permission signal EN, the excitation control circuit 13 outputs the drive control signal CT to the high-frequency inverter circuit 14 (excitation synchronizing signal generation circuit 14b). Thus, the inverter control signal Vss is output from the excitation synchronizing signal generation circuit 14b, and the continuous excitation of the primary coil L1 is started.

During the continuous excitation, the system controller 9 determines whether or not the excitation request signal RQ is canceled. When the excitation request signal RQ is continued, the system controller 9 continues the continuous excitation of the primary coil L1. In other words, the power supply to the appliance E is continued. Accordingly, the appliance E receives the power supply in a contactless manner from the power supplying device 1 and drives the load Z with the supplied power.

When the appliance E is removed from the setting surface 6 or when the excitation request signal Q is canceled, the system controller 9 determines that the excitation request signal RQ has been canceled and suspends the output of the permission signal EN to the power supplying module M.

Then, the system controller 9 waits for a new excitation request signal RQ and device authenticating signal ID from the power supplying module M and continues the intermittent excitation of the primary coil L1 until the excitation request signal RQ and device authenticating signal ID are input from the power supplying module M.

From when the power switch (not shown) of the power supplying device 1 is turned on to when the switch is turned off, the metal foreign object detection device 7 oscillates the oscillation circuit 7a to detect a metal piece 8.

The components of the oscillation circuit 7a are set to have design values that generate oscillation in a range of oscillation conditions from a state immediately after the oscillation circuit 7a starts to generate oscillation as the oscillation circuit 7a is driven and exceeds a limit value of no oscillation generation to a state just before the oscillation amplitude reaches a stable and maximum amplitude in the oscillation circuit 7a.

Specifically, the values or the types of the components are changed to set oscillation conditions at which oscillation just about starts when nothing is set on the setting surface 6 as shown in FIG. 5(a). As indicated by time period A1 in FIG. 6, this realizes the oscillation signal Vo of the oscillation circuit 7a.

In other words, a slight change in the electromagnetic characteristics of the metal detection antenna coil AT2 caused by a metal piece 8 changes the amplitude of the oscillation signal Vo of the oscillation circuit 7a.

When only the appliance E is set as shown in FIG. 5(c), the amplitude of the oscillation signal Vo of the oscillation circuit 7a is slightly attenuated as indicated at time period A2 in FIG. 6.

In contrast, when only a metal piece 8 is set as shown in FIG. 5(b), the electromagnetic characteristics of the metal detection antenna coil AT2 are quickly changed by the metal piece 8. Further, the oscillating operation of the oscillation circuit 7a is suspended and the output of the oscillation signal Vo is suspended as indicated by time period A3 in FIG. 6.

In the same manner, when a metal piece 8 is arranged between the appliance E and the setting surface 6 as shown in FIG. 5(d) and when a metal piece 8 is placed proximal to the appliance E as shown in FIG. 5(e), the electromagnetic characteristics of the metal detection antenna coil AT2 are quickly changed by the metal piece 8. Further, the oscillating operation of the oscillation circuit 7a is suspended and the output of the oscillation signal Vo is suspended as indicated by time period A4 in FIG. 6.

Accordingly, the oscillation circuit 7a allows for the metal piece 8 set on the setting surface 6 of the power supplying device 1 to be detected with high sensitivity.

When the metal foreign object detection device 7 detects the metal piece 8 and outputs the metal presence signal ST, the system controller 9 receives the metal presence signal ST via the excitation control circuit 13 and drives a notification lamp or a notification buzzer (neither shown) for a certain time period to notify the user of such a situation. The system controller 9 also suspends the output of the permission signal EN to the power supplying module M.

Then, the system controller 9 intermittently excites the primary coil L1 until the metal presence signal ST is canceled.

Accordingly, in this embodiment, the intermittent excitation prevents induction heating of the metal piece 8.

The contactless power supplying device of this embodiment has the advantages described below.

(1) In this embodiment, the design values of the components for the oscillation circuit 7a, namely, the design values of the transistor Q1, the metal detection antenna coil AT2, the first to third capacitors C1 to C3, and the first and second resistors R1 and R2, are set to generate oscillation in a range of oscillation conditions from a state immediately after the oscillation circuit 7a exceeds a limit value of no oscillation generation and starts to generate oscillation to a state just before the oscillation amplitude reaches a stable and maximum amplitude in the oscillation circuit 7a.

In other words, the design values for the oscillation circuit 7a are not set at values that allow for continuous oscillation to be maintained at stable oscillation amplitudes. Rather, the design values are set at values that generate oscillation in a range of oscillation conditions from immediately after oscillation can be started to just before a stable and continuous oscillation condition. As a result, a small change in an electromagnetic parameter related to oscillation can cause a large change in the oscillation amplitude of the oscillation signal Vo.

Consequently, when a small or thin metal piece 8 is arranged in the proximity of the metal detection antenna coil AT2, a small change in the electromagnetic characteristics of the antenna coil AT2 determines whether or not the oscillation circuit 7a generates oscillation and is converted into a great change in the oscillation amplitude of the oscillation signal Vo. Accordingly, the metal foreign object detection device 7 (oscillation circuit 7a) has high sensitivity and can detect a smaller metal piece 8.

(2) In this embodiment, the metal foreign object detection device 7 is arranged in the power supplying device 1. Thus, a metal piece 8 set on the setting surface 6 of the power supplying device 1 or a metal piece 8 located between the appliance E and the setting surface 6 can be detected solely at the side of the power supplying device 1. This allows for the supply of power to be controlled based on the detection of the metal piece 8.

(3) In this embodiment, the metal detection antenna coil AT2 formed on the setting surface 6 of the power supplying device 1 has a spiral shape. The spiral shape spreads out the coil AT2 in a planar direction of the setting surface 6 and allows for reduction in the thickness of the coil AT2. Further, the spiral coil AT2 can easily be formed through printed wiring or the like. Thus, the coil AT2 can be formed on both surfaces of the top plate 5 and have various shapes such as a circular shape or a rectangular shape.

(4) In this embodiment, the metal detection antenna coil AT2 is a component of the oscillation circuit 7a in the metal foreign object detection device 7. This reduces the number of components.

(5) In this embodiment, the metal detection antenna coil AT2 is formed on the setting surface 6 of the top plate 5. In other words, the metal detection antenna coil AT2 is formed at a location that would be closest to a metal piece 8. This further increases the metal detection sensitivity.

Second Embodiment

Figure 13:
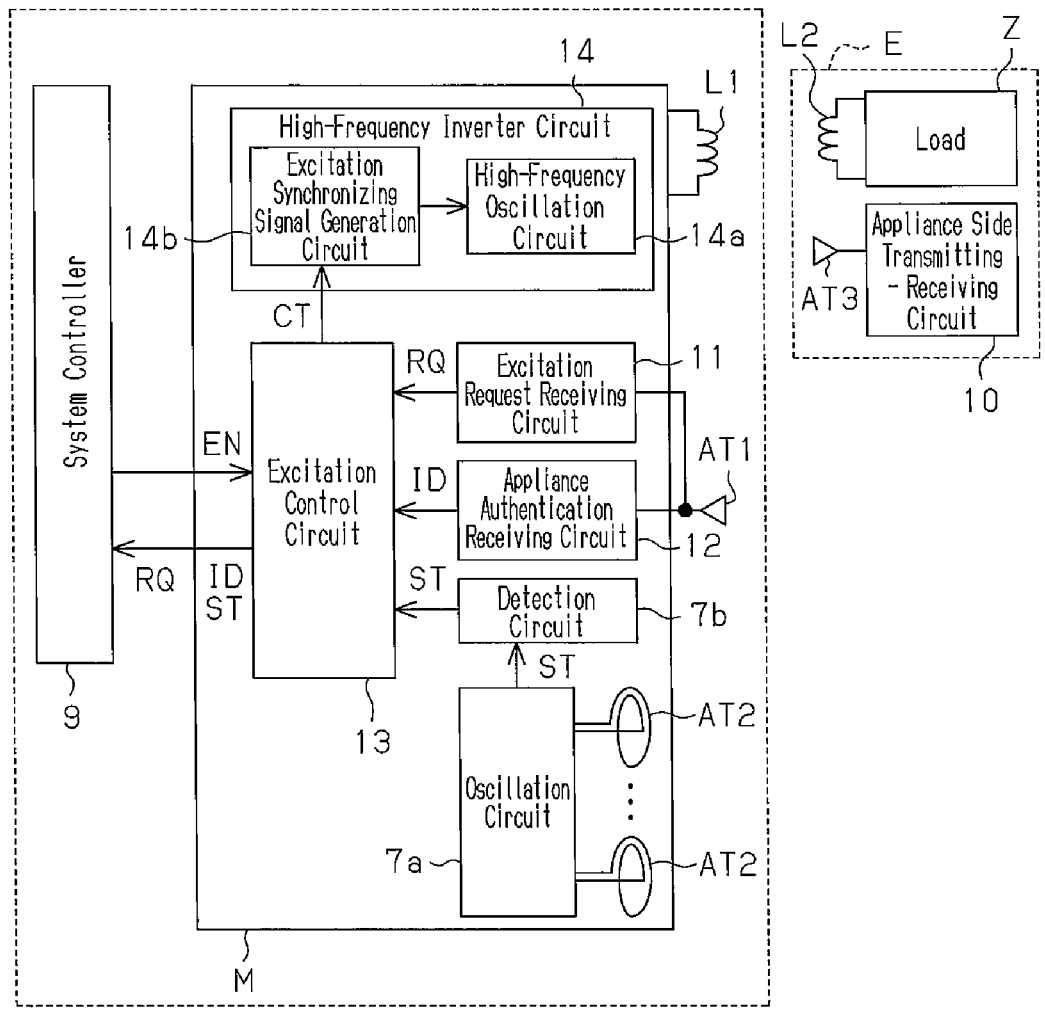
FIG. 13 is an electric circuit block diagram showing the electric configuration of the power supplying device and an appliance according to the second embodiment.
Figure 14:
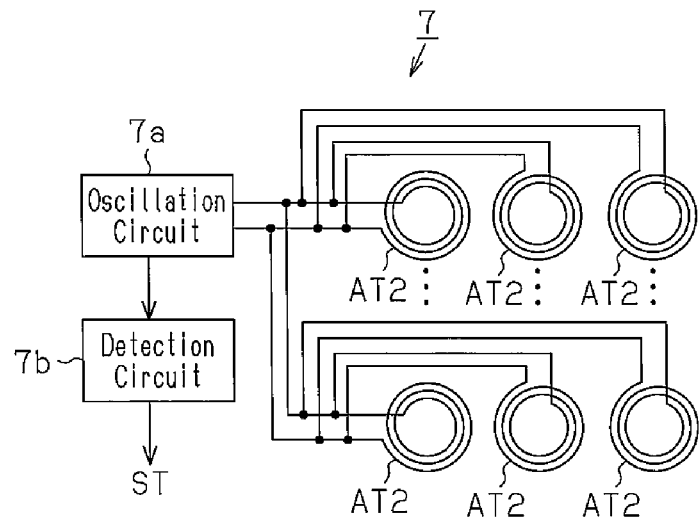
FIG. 14 is a circuit showing an electric configuration of a metal detection antenna coil according to the second embodiment.

A second embodiment will now be described with reference to FIGS. 12, 13 and 14.

In the power supplying device 1 of the first embodiment, the power supplying device 1 includes the single metal detection antenna coil AT2. The feature of this embodiment is in that the power supplying device 1 includes a plurality of metal detection antenna coils AT2.

For the sake of the brevity, same reference numerals are given to those components that are the same as the corresponding components of the first embodiment. Such components will not be described in detail.

Figure 12:
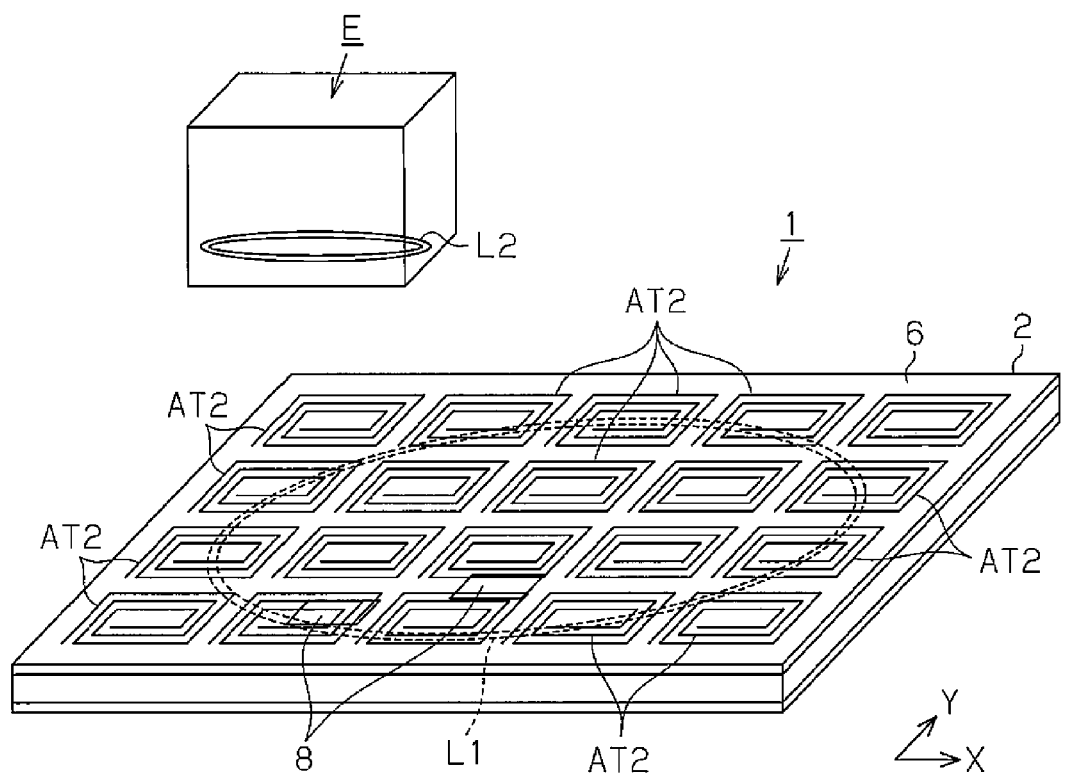
FIG. 12 is an overall perspective view showing a power supplying device according to a second embodiment.

In FIG. 12, a plurality of (twenty in FIG. 12) metal detection antenna coils AT2 are formed on the setting surface 6 of the power supplying device 1. The metal detection antenna coils AT2 of this embodiment have a size that is one twentieth of the metal detection antenna coil AT2 of the first embodiment. Five are arranged in the X direction and four are arranged in the Y direction on the setting surface 6. Each metal detection antenna coil AT2 is formed to have a spiral shape on the setting surface 6 through a known printed wiring method.

Each metal antenna coil AT 2 is connected to the metal foreign object detection device 7, which is arranged in the housing 2. As shown in FIG. 13, the metal foreign object detection device 7 detects a metal piece 8 set on the setting surface 6 with the metal detection antenna coils AT2.

The metal foreign object detection device 7 includes the oscillation circuit 7a and the detection circuit 7b. In the same manner as in the first embodiment, the oscillation circuit 7a is formed by a Colpitts oscillation circuit. As shown in FIG. 14, the metal detection antenna coils AT2 are connected in parallel, and the parallel circuit is connected to the oscillation circuit 7a.

In the same manner as in the first embodiment, the oscillation circuit 7a, which is connected to the metal detection antenna coils AT2, includes components set to generate oscillation in a range of oscillation conditions from a state immediately after the oscillation circuit 7a starts to generate oscillation as the oscillation circuit 7a is driven and exceeds a limit value of no oscillation generation to a state just before the oscillation amplitude reaches a stable and maximum amplitude in the oscillation circuit 7a.

Specifically, the values or the types of the components are changed to set oscillation conditions at which oscillation just about starts when nothing is set on the setting surface 6 as shown in FIG. 5(*a*). As indicated by time period A1 in FIG. 6, this realizes the oscillation signal Vo of the oscillation circuit 7a.

When only the appliance E is set as shown in FIG. 5(*c*), the amplitude of the oscillation signal Vo of the oscillation circuit 7a is slightly attenuated as indicated by time period A2 in FIG. 6.

In contrast, when only a metal piece 8 is set as shown in FIG. 5(*b*), the electromagnetic characteristics of the metal detection antenna coils AT2 are quickly changed by the metal piece 8. Further, the oscillating operation of the oscillation circuit 7a is suspended, and the output of the oscillation signal Vo is suspended as indicated by time period A3 in FIG. 6.

In the same manner, when the metal piece 8 is arranged between the appliance E and the setting surface 6 as shown in FIG. 5(*d*) and when the metal piece 8 is placed in the proximity of the appliance E as shown in FIG. 5(*e*), the electromagnetic characteristics of the metal detection antenna coils AT2 are quickly changed by the metal piece 8. Further, the oscillating operation of the oscillation circuit 7a is suspended and the output of the oscillation signal Vo is suspended as indicated by time period A4 in FIG. 6.

In addition to the advantages of the first embodiment, this embodiment has the advantages described below.

(1) In this embodiment, the metal detection antenna coils AT2 are formed by a plurality of small-area antenna coils. In other words, the plurality of small-area metal detection antenna coils AT2 are arranged in the setting surface 6, which has the same area. This increase the resolution and allows for detection of a smaller metal piece 8.

Further, the plurality of metal detection antenna coils AT2 are connected in parallel to the single oscillation circuit 7a. This prevents the detection sensitivity from decreasing. Thus, the single oscillation circuit 7a ensures a wide detection area and allows for the detection of a smaller metal piece 8.

Further, the single oscillation circuit 7a allows for detection of a wide area, decrease in power consumption, and reduction in the number of the components. Further, by arranging a plurality of oscillation circuits 7a, each having the plurality of antenna coils AT2, the detection area is easily expanded, and application to a wide power supply surface is possible.

Figure 15:
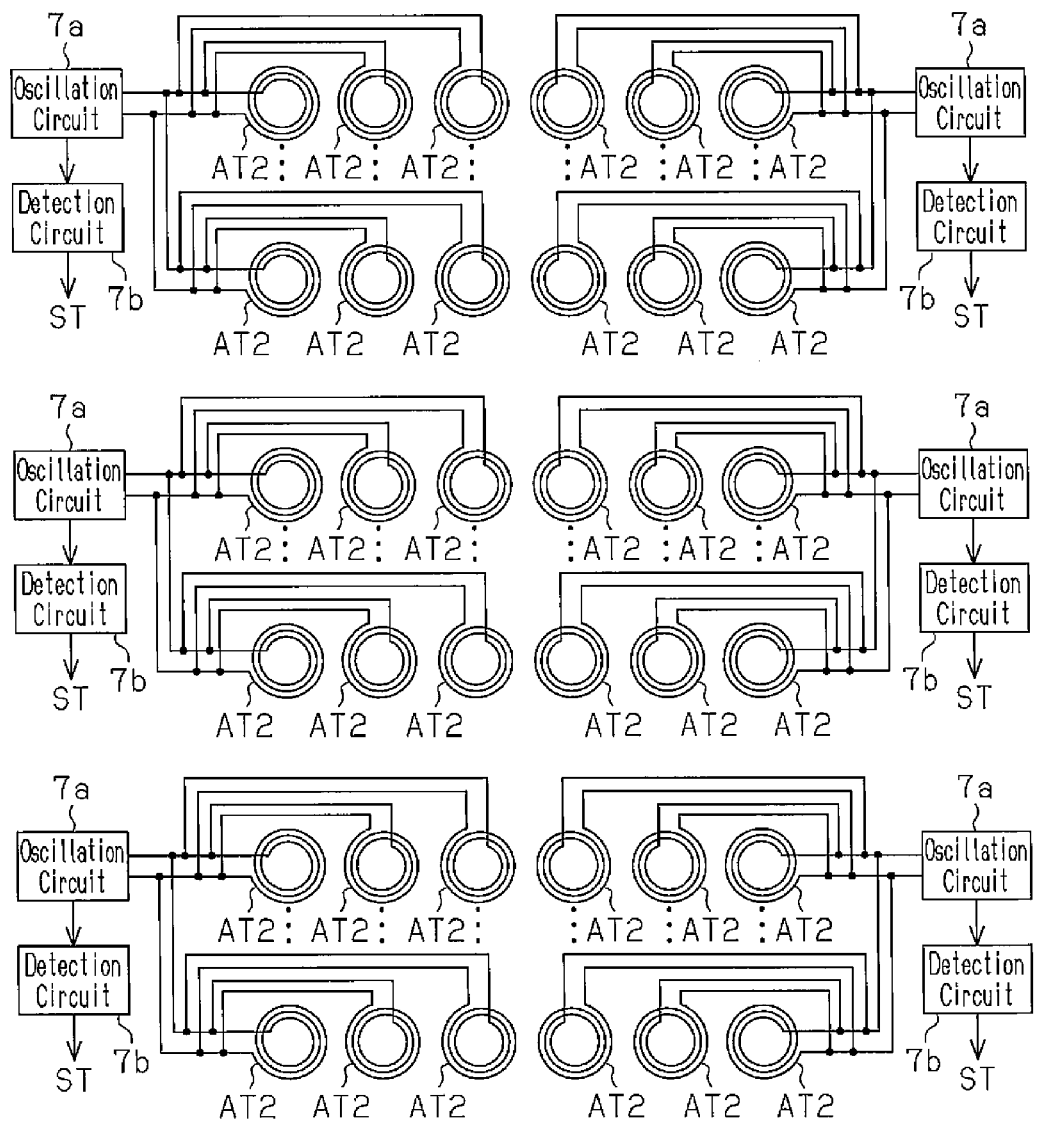
FIG. 15 is an electric circuit diagram showing a further example of the second embodiment.

In this embodiment, the plurality of metal detection antenna coils AT2 are connected in parallel with each other, and the parallel circuit is connected to the single oscillation circuit 7a. As shown in FIG. 15, the plurality of metal detection antenna coils AT2 may be divided into a plurality of groups, and each group may include the metal foreign object detection device 7 (a single oscillation circuit 7a and a single detection circuit 7b). In this case, by connecting the plurality of metal detection antenna coils AT2 of each group in parallel, the parallel circuit may be connected to the corresponding oscillation circuit 7a.

In other words, by arranging a plurality of sets of the oscillation circuit 7a and detection circuit 7b (i.e., metal foreign object detection devices 7), the detection area can easily be expanded, and application to a wide setting surface 6 is possible.

Third Embodiment

A third embodiment will now be described with reference to FIGS. 16 and 17.

In the first and second embodiments, the metal foreign object detection device 7 is arranged in the power supplying device 1. In this embodiment, the metal foreign object detection device 7 is arranged in the appliance E.

For the sake of brevity, same reference numerals are given to those components that are the same as the corresponding components of the first embodiment. Such components will not be described in detail.

Figure 16:
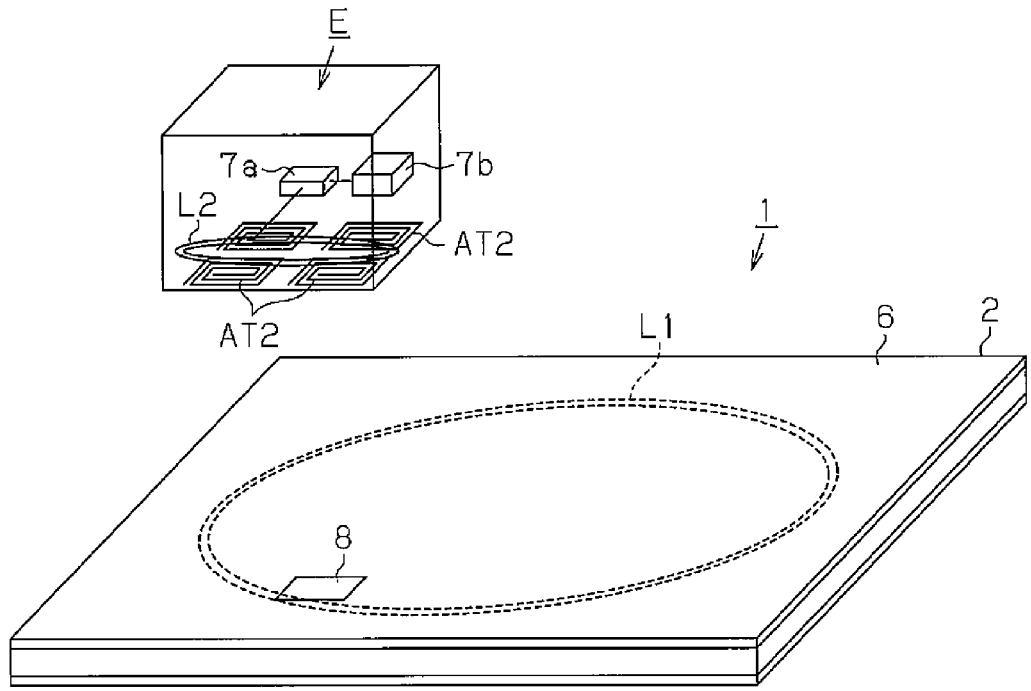
FIG. 16 is an overall perspective view showing a power supplying device and an appliance according to a third embodiment.
Figure 17:
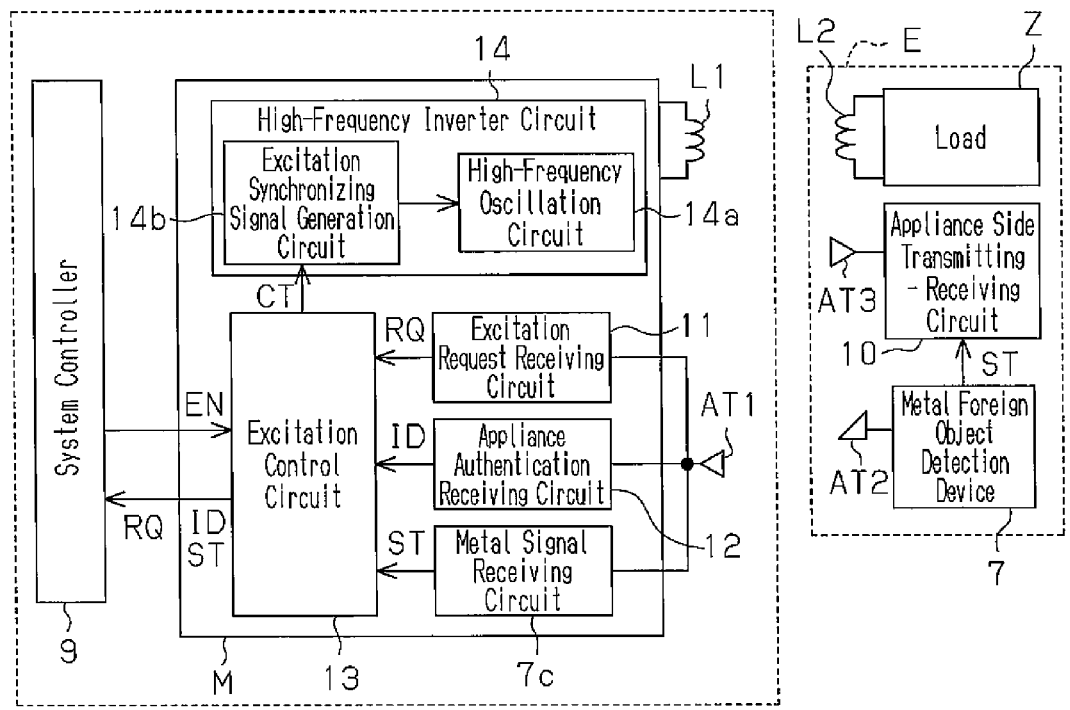
FIG. 17 is an electric circuit block diagram showing the electric configuration of the power supplying device and the appliance according to the third embodiment.

In FIG. 16, a plurality of (four in this embodiment) metal detection antenna coils AT2 are formed on a lower surface of the housing of the appliance E, that is, a power receiving surface that comes into contact with the setting surface 6 of the power supplying device 1. In the same manner as the first and second embodiments, each metal detecting antenna coil AT2 is formed to have a spiral shape on the lower surface by a known printed wiring method. In this embodiment, a metal detection antenna coil AT2 is not formed in the setting surface 6 of the power supplying device 1.

Further, the metal foreign object detection device 7 including the oscillation circuit 7a and the detection circuit 7b is arranged in the appliance E. The metal detection antenna coils AT2 formed on the lower surface of the appliance E are connected in parallel, and the parallel circuit is connected to the oscillation circuit 7a of the metal foreign object detection device 7. The metal detection antenna coils AT2 form part of the metal foreign object detection device 7. The metal foreign object detection device 7 detects a metal piece 8 arranged between the appliance E set on the setting surface 6 and the setting surface 6 with the metal detection antenna coils AT2.

In the same manner as the first embodiment, the oscillation circuit 7a of the metal foreign object detection device 7 is formed by a Colpitts oscillation circuit. In the same manner as the first embodiment, the oscillation circuit 7a includes components having design values that generate oscillation in a range of oscillation conditions from a state immediately after the oscillation circuit 7a starts to generate oscillation as the oscillation circuit 7a is driven and exceeds a limit value of no oscillation generation to a state proximal to a condition where the oscillation amplitude reaches a stable and maximum amplitude in the oscillation circuit 7a.

Consequently, when the appliance E is set on the setting surface 6 of the power supplying device 1 with a metal piece is arranged between the appliance E and the setting surface 6 or placed in the vicinity of the appliance E, the electromagnetic characteristics of the metal detection antenna coils AT2 are quickly changed by the metal piece 8. Further, the oscillating operation of the oscillation circuit 7a is suspended, and the output of the oscillation signal Vo is suspended.

Accordingly, the oscillation circuit 7a can detect a metal piece 8 that is set on the setting surface 6 of the power supplying device 1 with high sensitivity.

The oscillation signal Vo is output from the oscillation circuit 7a to the detection circuit 7b. When the amplitude value of the oscillation signal Vo is less than a predetermined reference value, the detection circuit 7b determines that the metal piece 8 is arranged between the appliance E and the setting surface 6 or placed in the proximity of the setting surface 6 and outputs the metal presence signal ST.

In contrast, when the amplitude value of the oscillation signal Vo is greater than or equal to the predetermined reference value, the detection circuit 7b determines that only the appliance E is set on the setting surface 6 and does not output the metal presence signal ST.

The detection circuit 7b outputs the metal presence signal ST to the appliance side transmitting-receiving circuit 10. The appliance side transmitting-receiving circuit 10 transmits the input metal presence signal ST to the power supplying device 1 via the transmitting-receiving antenna coil AT3.

The DC power source B of the oscillation circuit 7a is an auxiliary power source (secondary battery) incorporated in the appliance E. When the appliance E is set on the setting surface 6 of the intermittently excited power supplying device 1, the auxiliary power source (secondary battery) is charged with the secondary power generated at the secondary coil L2. Accordingly, when the appliance E is set on the setting surface 6 of the intermittently excited power supplying device 1 and the auxiliary power source (secondary battery) is charged with the secondary power generated at the secondary coil L2, the appliance side transmitting-receiving circuit 10 is driven and the oscillation circuit 7a starts the oscillating operation.

The power supplying module M of the power supplying device 1 includes a metal signal receiving circuit 7c. The metal signal receiving circuit 7c is connected to the signal receiving antenna coil AT1 of the power supplying module M. The metal signal receiving circuit 7c receives the transmission signal transmitted from the appliance E set on the setting surface 6 and extracts the metal presence signal ST from the received transmission signal. After the metal presence signal ST is extracted from the transmission signal, the metal signal receiving circuit 7c outputs extracted metal presence signal ST to the excitation control circuit 13.

The excitation control circuit 13 outputs the metal presence signal ST to the system controller 9. When the metal presence signal ST is input, the system controller 9 does not output the permission signal EN. Thus, the excitation control circuit 13 does not output the drive control signal CT to the high-frequency inverter circuit 14 to excite and drive the primary coil L1 and thereby supply power.

This embodiment has the advantages described below.

(1) In this embodiment, the metal foreign object detection device 7 is arranged in the appliance E. Further, the components of the oscillation circuit 7a arranged in the appliance E have design values set at values that generate oscillation in a range of oscillation conditions from immediately after oscillation can be started to just before a stable and continuous oscillation condition. As a result, a small change in an electromagnetic parameter related to oscillation can cause a large change in the oscillation amplitude of the oscillation signal Vo.

Thus, when a small or thin metal piece 8 is arranged in the vicinity of the metal detection antenna coils AT2, a small change in the electromagnetic characteristics of the antenna coils AT2 determines whether or not the oscillation circuit 7a generates oscillation and is converted into a significant change in the oscillation amplitude of the oscillation signal Vo. Accordingly, the metal foreign object detection device 7 (oscillation circuit 7a) has high sensitivity, and a smaller metal piece 8 can be detected.

(2) In this embodiment, the metal foreign object detection device 7 is arranged in the appliance E. Accordingly, the appliance E has a detection function, and the accuracy can be increased for detecting a metal piece 8 adhering to or placed in the vicinity of the appliance E or a metal piece 8 arranged between the power supplying device and the appliance E.

(3) In this embodiment, the metal detection antenna coils AT2 is formed on the lower surface of the housing of the appliance E. In other words, the metal detection antenna coils AT2 are located at positions that would be closest to a metal piece 8 when the appliance E is set on the setting surface 6. This further increases the metal detection sensitivity.

Fourth Embodiment

A fourth embodiment will now be described with reference to FIGS. 18, 19, 20, and 21.

In the first and second embodiments, the metal foreign object detection device 7 is arranged in the power supplying device 1. In the third embodiment, the metal foreign object detection device 7 is arranged in the appliance E. The feature of this embodiment is in that the metal foreign object detection device 7 is arranged in a distributed manner in the power supplying device 1 and the appliance E.

For the sake of brevity, same reference numerals are given to those components that are the same as the corresponding components of the first embodiment. Such components will not be described in detail.

Figure 18:
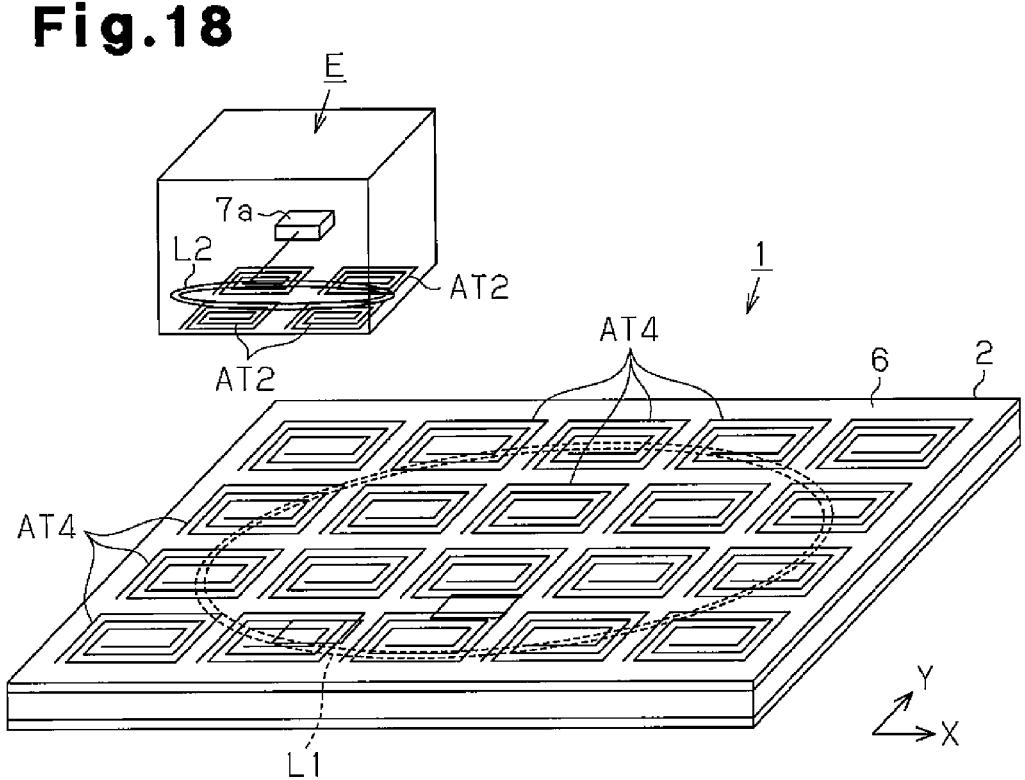
FIG. 18 is an overall perspective view showing a power supplying device and an appliance according to a fourth embodiment.

As shown in FIG. 18, a plurality of (four in this embodiment) metal detection antenna coils AT2 are formed in the lower surface of the housing of the appliance E, that is, the power receiving surface that comes into contact with the setting surface 6 of the power supplying device 1. In the same manner as the third embodiment, each metal detection antenna coil AT2 is formed to have a spiral shape on the lower surface of the housing of the appliance E through a known printed wiring method. The metal detection antenna coils AT2 are connected in parallel, and the parallel circuit is connected to the oscillation circuit 7a of the metal foreign object detection device 7 arranged in the appliance E.

Figure 19:
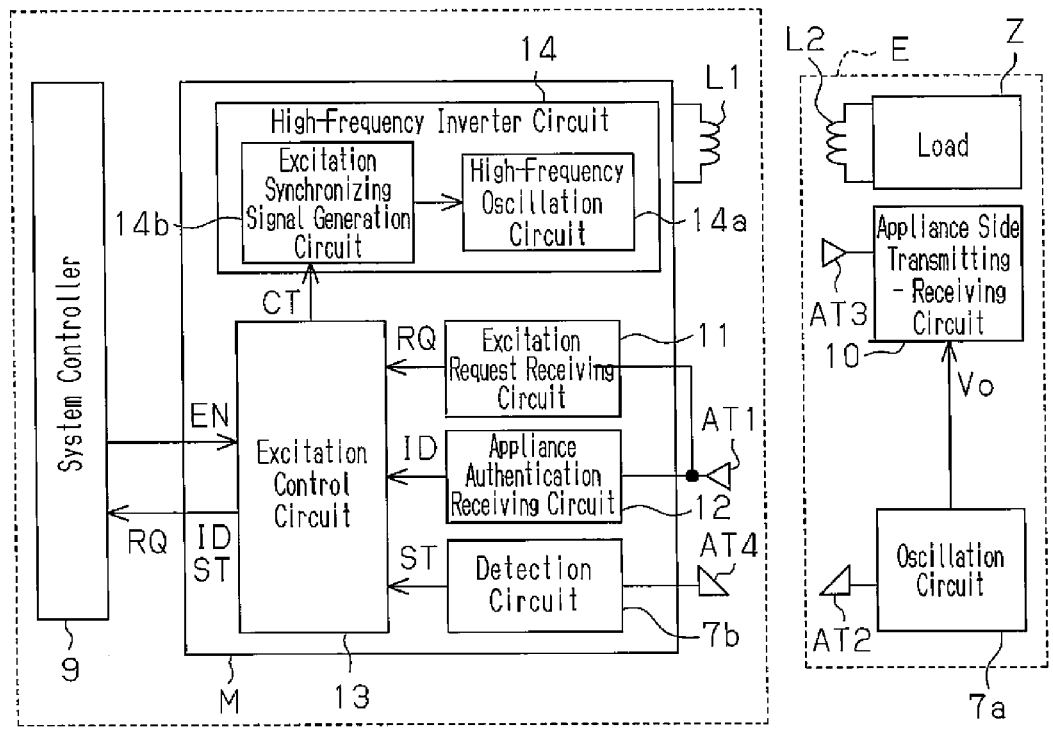
FIG. 19 is an electric circuit block diagram showing the electric configuration of the power supplying device and the appliance according to the fourth embodiment.

In the same manner as the third embodiment, the oscillation circuit 7a shown in FIG. 19 is formed by a Colpitts oscillation circuit. In the same manner as the third embodiment, the oscillation circuit 7a, to which the metal detection antenna coils AT2 are connected, includes components that have design values that generate oscillation in a range of oscillation conditions from a state immediately after the oscillation circuit 7a starts to generate oscillation as the oscillation circuit 7a is driven and exceeds a limit value of no oscillation generation to a state proximal to a condition where the oscillation amplitude reaches a stable and maximum amplitude in the oscillation circuit 7a.

Consequently, when the metal piece 8 is arranged between the appliance E and the setting surface 6 or placed in the vicinity of the appliance E with the appliance E set on the setting surface 6 of the power supplying device 1, the electromagnetic characteristics of the metal detection antenna coils AT2 are quickly changed by the metal piece 8. Further, the oscillating operation of the oscillation circuit 7a is suspended, and the output of the oscillation signal Vo is suspended.

Accordingly, the oscillation circuit 7a allows for a metal piece 8 set on the setting surface 6 of the power supplying device 1 to be detected with high sensitivity.

Further, when the oscillating operation of the oscillation circuit 7a is suspended, the appliance side transmitting-receiving circuit 10 suspends the transmission of the appliance authenticating signal ID.

The DC power source B of the oscillation circuit 7a is an auxiliary power source (secondary battery) incorporated in the appliance E. The auxiliary power source (secondary battery) is charged with the secondary power generated at the secondary coil L2 when the appliance E is set on the setting surface 6 of the intermittently excited power supplying device 1. The auxiliary power source may be an electric storage device such as a capacitor. Accordingly, when the appliance E is set on the setting surface 6 of the intermittently excited power supplying device 1 and the auxiliary power source (secondary battery) is charged with the secondary power generated at the secondary coil L2, the appliance side transmitting-receiving circuit 10 is driven and the oscillation circuit 7a starts the oscillating operation. In this state, until the auxiliary battery (secondary battery) is completely charged, the appliance side transmitting-receiving circuit 10 and the oscillation circuit 7a conduct intermittent operations in synchronization with the intermittent excitation of the primary coil L1.

A plurality (twenty in FIG. 18) of receiving antenna coils AT4 are formed on the setting surface 6 of the power supplying device 1. The receiving antenna coils AT4 in this embodiment are formed so that five are arranged in the X direction and four are arranged in the Y direction on the setting surface 6. The receiving antenna coils AT4 are formed to have a spiral shape on the setting surface 6 through a known printed wiring method. The receiving antenna coils AT4 are connected to the detection circuit 7b of the metal foreign object detection device 7 in the power supplying device 1 (housing 2).

The receiving antenna coils AT4 each detect a change in the magnetic flux emitted from the metal detection antenna coils AT2 arranged in the appliance E set on the setting surface 6 and output a detection signal having a voltage waveform corresponding to the change in the magnetic flux to the detection circuit 7b.

In other words, when the appliance E is set on the setting surface 6 and the metal piece 8 is arranged between the setting surface 6 and the appliance E or placed in the vicinity of the appliance E, the oscillation circuit 7a suspends the oscillation or attenuates the amplitude of the oscillation signal Vo to an amplitude value that is close to zero. The receiving antenna coils AT4 detect changes in the magnetic flux from the metal detection antenna coils AT2 and output a detection signal having a smaller amplitude value than a specified value to the detection circuit 7b. As a result, the detection circuit 7b detects the presence of the metal piece 8 based on the amplitude level of the detection signal received by the receiving antenna coils AT4 and outputs the metal presence signal ST.

FIGS. 20(a) to 20(g) show different states between the power supplying device 1 and the setting surface 6.

Figure 20A:
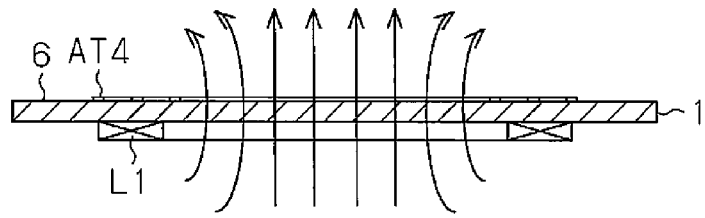
FIG. 20(a) is a diagram showing a state in which nothing is set on the power supplying device.

FIG. 20(a) shows a state in which nothing is set on the setting surface of the power supplying device 1.

Figure 20B:
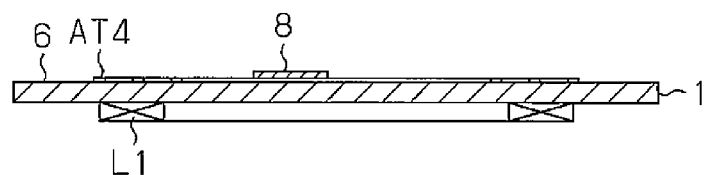
FIG. 20(b) is a diagram showing a state in which only a metal piece is set on the power supplying device.

FIG. 20(b) shows a state in which only a metal piece 8 is set on the setting surface 6 of the power supplying device 1.

Figure 20C:
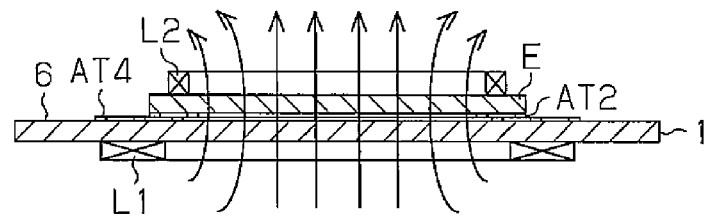
FIG. 20(c) is a diagram showing a state in which only an appliance is set on the power supplying device.

FIG. 20(c) shows a state in which only the appliance E is set on the setting surface 6 of the power supplying device 1.

Figure 20D:
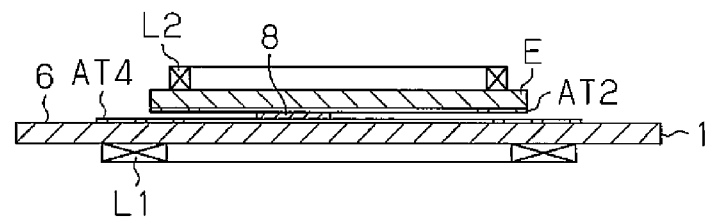
FIG. 20(d) is a diagram showing a state in which a metal piece is arranged between a setting surface of the power supplying device and the appliance.

FIG. 20(d) shows a state in which a metal piece 8 is arranged between the setting surface 6 of the power supplying device 1 and the appliance E.

Figure 20E:
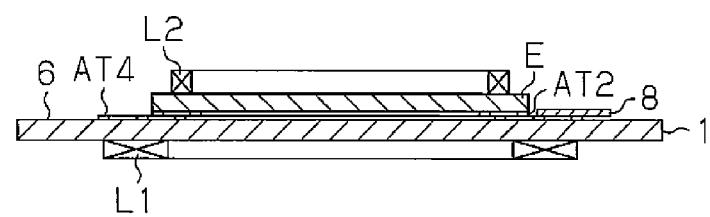
FIG. 20(e) is a diagram showing a state in which a metal piece is set at a position separated from the appliance.

FIG. 20(e) shows a state in which a metal piece 8 is set on the setting surface 6 of the power supplying device 1 at a position separated from the appliance E.

Figure 20F:
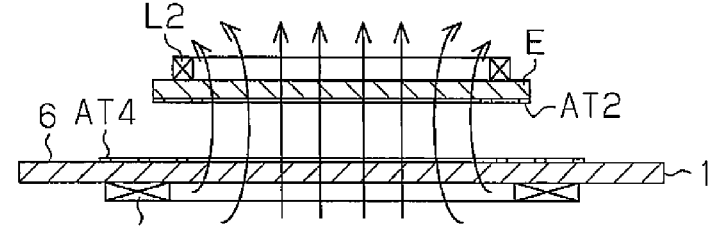
FIG. 20(f) is a diagram showing a state in which power is supplied with the setting surface of the power supplying device separated from the appliance.

FIG. 20(f) shows a state in which the power supplying device 1 and the appliance E are separated when power is supplied.

Figure 20G:
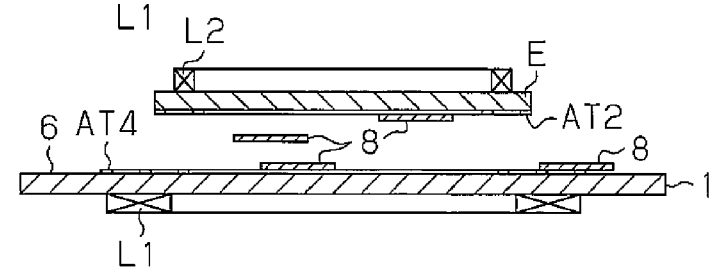
FIG. 20(g) is a diagram showing a metal piece separated from the setting surface of the power supplying device and other metal pieces arranged in the space between the setting surface and the metal piece.

FIG. 20(g) shows a state in which the setting surface 6 of the power supplying device 1 and a metal piece 8 are separated and further metal pieces 8 are arranged in or near the space separating the setting surface 6 and the metal piece 8.

Figure 21:
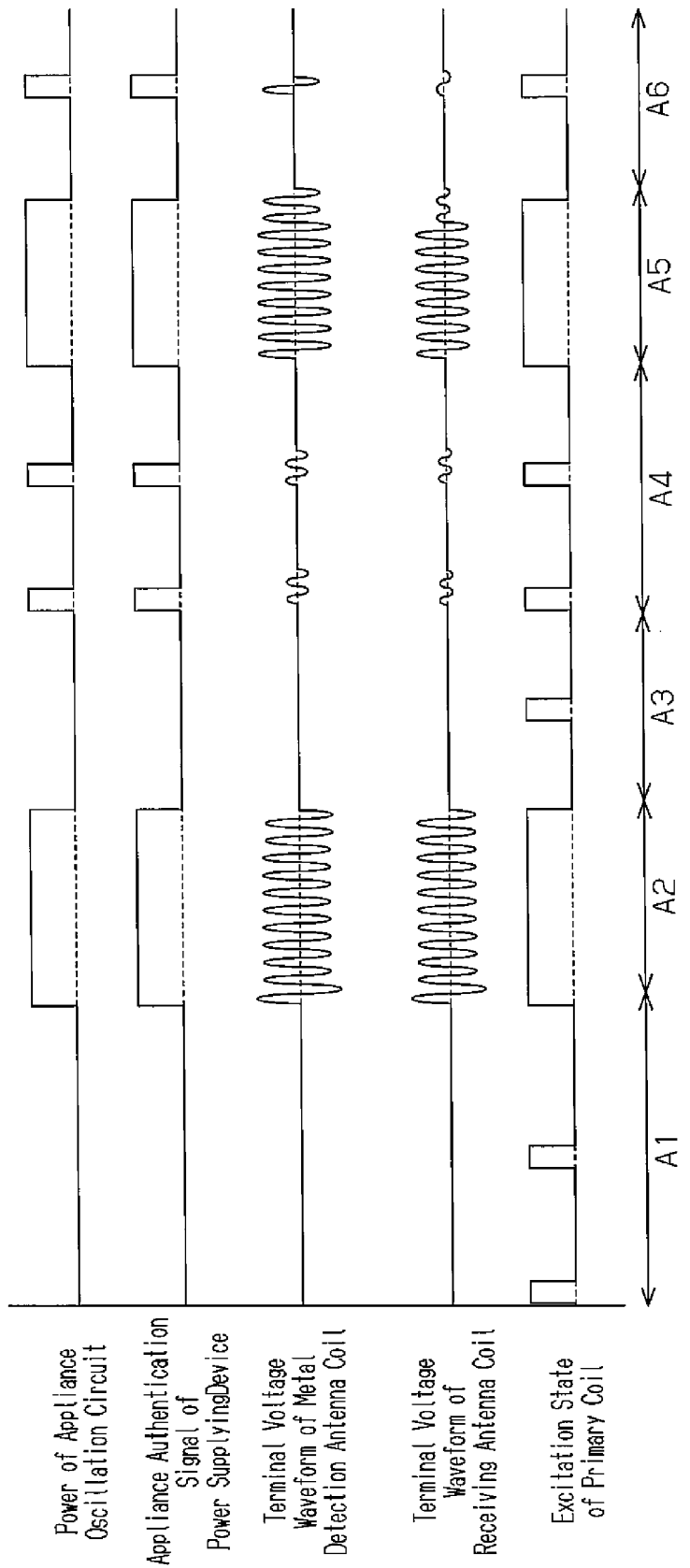
FIG. 21 is an output waveform diagram showing an oscillation signal of the oscillation circuit.

In each of the above states, when nothing is set on the setting surface 6 as shown in FIG. 20(a), the appliance side transmitting-receiving circuit 10 and the oscillation circuit 7a do not receive the secondary power from the secondary coil L2 as indicated by time period A1 in FIG. 21. Thus, the appliance side transmitting-receiving circuit 10 does not transmit the appliance authenticating signal ID, and the oscillation circuit 7a is not oscillated. As a result, terminal voltages of the metal detection antenna coils AT2 and the receiving antenna coils AT4 become zero. Further, since no device authenticating signal ID is transmitted from the appliance E, the power supplying device 1 (the primary coil L1) performs the intermittent excitation.

Moreover, when only a metal piece 8 is set on the setting surface 6 of the power supplying device 1 as shown in FIG. 20(b), the appliance side transmitting-receiving circuit 10 and the oscillation circuit 7a do not receive the secondary power from the secondary coil L2 as indicated by time period A3 in FIG. 21. Thus, the appliance side transmitting-receiving circuit 10 does not transmit the appliance authenticating signal ID, and the oscillation circuit 7a is not oscillated. As a result, the terminal voltages of the metal detection antenna coils AT2 and the receiving antenna coils AT4 become zero. Further, since no device authenticating signal ID is transmitted from the appliance E, the power supplying device 1 (the primary coil L1) performs the intermittent excitation to an extent that the metal piece 8 is not heated by induction.

When only the appliance E is set on the setting surface 6 of the power supplying device 1 as shown in FIG. 20(c), the appliance side transmitting-receiving circuit 10 and the oscillation circuit 7a receive the secondary power from the secondary coil L2 as indicated by time period A2 in FIG. 21. Thus, the appliance E (the appliance side transmitting-receiving circuit 10) transmits the appliance authenticating signal ID, and the oscillation circuit 7a is continuously oscillated at the maximum amplitude.

As a result, the terminal voltages of the receiving antenna coils AT4 of the power supplying device 1 become a continuous oscillation signal having the maximum amplitude. Consequently, a metal presence signal ST is not generated, and the power supplying device 1 (primary coil L1) is continuously excited.

When power is supplied with the setting surface 6 of the power supplying device 1 and the appliance E separated from each other as shown in FIG. 20(f), the appliance side transmitting-receiving circuit 10 and the oscillation circuit 7a receive the secondary power from the secondary coil L2 as indicated by time period A5 in FIG. 21. Thus, the appliance E (the appliance side transmitting-receiving circuit 10) transmits the appliance authenticating signal ID, and the oscillation circuit 7a is continuously oscillated at the maximum amplitude.

As a result, the terminal voltages of the receiving antenna coils AT4 of the power supplying device 1 become a continuous oscillation signal although the amplitude is slightly attenuated. Consequently, a metal presence signal ST is not generated, and the power supplying device 1 (the primary coil L1) is continuously excited.

When the metal piece 8 is arranged between the setting surface 6 of the power supplying device 1 and the appliance E as shown in FIG. 20(d), as indicated by time period A6 in FIG. 21, the appliance authenticating signal ID is intermittently transmitted from the appliance E. However, the oscillation signal Vo of the oscillation circuit 7a becomes an intermittent oscillation having an amplitude value of approximately zero or the oscillation of the oscillation circuit 7a is suspended. The same applies to FIG. 20(e).

As a result, the metal presence signal ST is generated, and the power supplying device 1 (primary coil L1) performs the intermittent excitation to the extent that the metal piece 8 is not heated by induction.

When a metal piece 8 is separated from the setting surface 6 of the power supplying device 1 and other metal pieces 8 are located in or near the space between the setting surface 6 and the separated metal piece 8 as shown in FIG. 20(g), as indicated by time period A6 in FIG. 21, the appliance authenticating signal ID is intermittently transmitted from the appliance E. However, the oscillation signal Vo of the oscillation circuit 7a becomes an intermittent oscillation having an amplitude value of close to zero or the oscillation of the oscillation circuit 7a is suspended. Also, the terminal voltages of the receiving antenna coils AT4 for detecting changes in the magnetic flux from the metal detection antenna coils AT2 are attenuated due to the absorption of the electromagnetic wave from the metal detection antenna coils AT2 by the interposed metal pieces 8.

As a result, the metal presence signal ST is produced, and the power supplying device 1 (the primary coil L1) performs the intermittent excitation to an extent that the metal piece 8 is not heated by induction.

This embodiment has the advantages described below.

(1) In this embodiment, the metal foreign object detection device 7 is provided with the power supplying device 1 including the metal detection antenna coils AT2 and the oscillation circuit 7a. Further, the appliance E includes the receiving antenna coils AT4 and the detection circuit 7b. In other words, the metal foreign object detection device 7 is divided and arranged in the power supplying device 1 and the appliance E.

Accordingly, the metal foreign object detection device 7 can detect a metal foreign object arranged between the power supplying device 1 and the appliance E using not only the suspension or attenuation of the oscillation circuit at the appliance side but also the attenuation in the magnetic flux transmitted to the receiving antenna coils AT4 in the power supplying device 1. Thus, a smaller metal piece 8 can be detected.

Further, the metal foreign object detection device 7 is applicable to spatial power supplying performed with the primary coil L1 and the secondary coil L2 separated by several centimeters to several tens centimeters or greater, such as a magnetic resonance system or an electromagnetic induction system including the secondary coil L2 or a resonance circuit in the secondary coil L2.

The embodiments described above each may be modified as described below.

The oscillation circuit 7a of the metal foreign object detection device 7 includes a Colpitts oscillation circuit in each of the above embodiments. However, the oscillation circuit 7a is not limited in such a manner and may be a different oscillation circuit such as a Hartley oscillation circuit.

The spiral metal detection antenna coil AT2 that is tetragonal is used in each of the above embodiments. However, the metal detection antenna coil AT2 is not limited in such a manner and may have a different such as circular shape and ellipsoidal shape.

The oscillation frequency of the oscillation circuit 7a of the metal foreign object detection device 7 is not particularly limited in each of the above embodiments. However, the oscillation frequency of the oscillation circuit 7a (oscillation signal Vo) may be set to be higher than the oscillation frequency of the high-frequency inverter circuit 14 (high-frequency oscillating circuit 14a) that excites the primary coil L1 for the power supply.

The frequency at which the metal detection antenna coil AT2 is excited can be set to be higher than the frequency at which the primary coil L1 is excited. This reduces the influence of the magnetic flux of the primary coil L1 and increases the detection accuracy. Further, this structure arrangement reduces the number of windings of the metal detection antenna coil AT2 or shortens the wire length of the coil.

Figure 22:
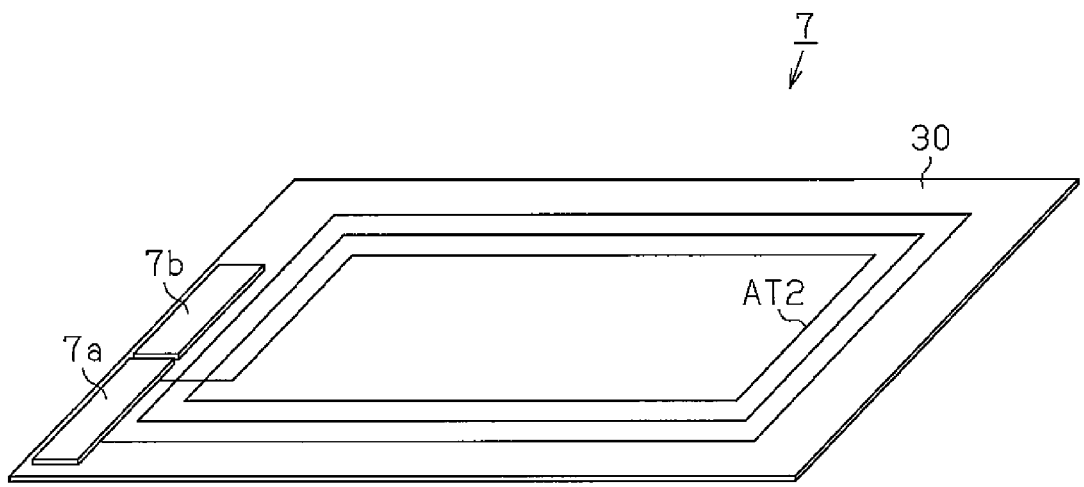
FIG. 22 is a perspective view showing another example of the metal foreign object detection device.

In the first and second embodiments, the metal detection antenna coil AT2 is formed in the setting surface 6 of the power supplying device 1, and the oscillation circuit 7a and the detection circuit 7b of the metal foreign object detection device 7 are arranged in the housing 2. Instead, as shown in FIG. 22, an independent metal foreign object detection device 7 may be formed by forming a spiral metal detection antenna coil AT2 on a surface of a thin insulating flexible substrate 30 (or thin hard substrate) and arranging the oscillation circuit 7a and the detection circuit 7b at one first side of the surface of the flexible substrate 30. Then, a wire is formed on the metal foreign object detection device 7 to connect a signal line and power line to the power supplying device 1.

By arranging the metal foreign object detection device 7 on the setting surface of an existing power supplying device, an existing power supplying device can be used as a contactless power supplying system having a metal detection function.

Further, the spiral receiving antenna coil AT4 is formed on a surface of a thin insulating flexible substrate (or thin hard substrate), and the detection circuit 7b is set at one side in the surface of the flexible substrate. In addition, a wire connects the detection circuit 7b to an existing power supplying device 1 with a signal line and power line.

By arranging the substrate on the setting surface of the existing power supplying device, the existing power supplying device can serve as a contactless power supplying system with a metal detection function in the same manner as the fourth embodiment.

In each of the above embodiments, the detection circuit 7b determines the presence of a metal piece 8 based on the magnitude of the amplitude value of the oscillation signal Vo. However, the detection circuit 7b may determine the presence of a metal piece 8 based on a change in the frequency. In this arrangement, the components of the oscillation circuit 7a have design values set not at values under which the continuous oscillation at a stable oscillation frequency can be maintained but at values in a range from a state in which the frequency is instable to a state just before a continuous oscillation condition under a stable oscillation frequency. In addition, there is a need to cause a great change to the oscillation frequency with a small change in electromagnetic parameters related to the oscillation.

In each of the first to third embodiments, the metal detection antenna coil AT2 is formed in one of the power supplying device 1 and the appliance E, and the one with the metal detection antenna coil AT2 further includes the oscillation circuit 7a and the detection circuit 7b. However, the power supplying device 1 and the appliance E may both include the metal detection antenna coil AT2, the oscillation circuit 7a, and the detection circuit 7b. This allows for further fine and accurate detection.

In each of the above embodiments, the metal detection antenna coil AT2 is spiral. However, the metal detection antenna coil AT2 may have a different shape, such as looped shape or a helical shape.

The invention claimed is:

1. A contactless power supplying system comprising:
   a power supplying device including a primary coil and a high-frequency inverter that applies high-frequency current to the primary coil;
   an appliance including a secondary coil that generates an induced electromotive force using an alternate magnetic field generated by the current flowing to the primary coil, wherein the appliance uses the electromotive force generated at the secondary coil to supply power to a load; and
   a metal foreign object detection device including
      an antenna coil,
      an oscillation circuit that applies high-frequency current to the antenna coil, and
      a detection circuit that detects a change in voltage or current observed at one of the oscillation circuit and the antenna coil, wherein
      the oscillation circuit includes a component having a design value that generates oscillation in a range of oscillation conditions from immediately after the oscillation circuit starts to generate oscillation to just before a stable and continuous oscillation condition, and
      the metal foreign object detection device detects, with the detection circuit, a suspension of the oscillation of the oscillation circuit or an attenuation in amplitude of the oscillation based on a change in an electric characteristic of the antenna coil caused by a metal foreign object arranged on the power supplying device, and controls the power supplying device.

2. The contactless power supplying system according to claim 1, wherein the antenna coil is a component included in the oscillation circuit.

3. The contactless power supplying system according to claim 1, wherein the antenna coil includes a plurality of small-area coils.

4. The contactless power supplying system according to claim 3, wherein the antenna coil includes the small-area coils that are connected in parallel.

5. The contactless power supplying system according to claim 1, wherein the metal foreign object detection device is arranged in the power supplying device.

6. The contactless power supplying system according to claim 1, wherein the metal foreign object detection device is arranged in the appliance and transmits a signal of the detection circuit to the power supplying device to control the power supplying device.

7. The contactless power supplying system according to claim 1, wherein
   the appliance includes the antenna coil and the oscillation circuit, and the power supplying device includes the detection circuit, and
   the detection circuit includes a receiving antenna coil that receives a signal from the antenna coil of the appliance.

8. The contactless power supplying system according to claim 1, wherein the antenna coil is arranged on at least one of a power supplying surface, which is formed by a housing of the power supplying device, and a power receiving surface, which is formed by a housing of the appliance.

9. The contactless power supplying system according to claim 1, wherein an oscillation frequency of the oscillation circuit is higher than an oscillation frequency of the high-frequency inverter.

10. The contactless power supplying system according to claim 1, wherein the antenna coil is formed to have a spiral shape.

11. A metal foreign object detection device for a contactless power supplying system that excites a primary coil of a power supplying device to generate an induced electromotive force with electromagnetic induction at a secondary coil of an appliance arranged on the power supplying device and supply the induced electromotive force to a load of the appliance, the metal foreign object detection device comprising:
   an antenna coil;
   an oscillation circuit that applies high-frequency current to the antenna coil; and
   a detection circuit that detects a change in voltage or current observed at one of the oscillation circuit and the antenna coil, wherein
   the oscillation circuit includes a component having a design value that generates oscillation in a range of oscillation conditions from immediately after the oscillation circuit starts to generate oscillation to just before a stable and continuous oscillation condition, and
   the detection circuit detects suspension of the oscillation of the oscillation circuit or an attenuation in amplitude of the oscillation based on a change in an electric characteristic of the antenna coil caused by a metal foreign object arranged on the power supplying device, and controls the power supplying device.

12. The metal foreign object detection device according to claim 11, wherein the antenna coil is a component included in the oscillation circuit.

13. The metal foreign object detection device according to claim 11, wherein the antenna coil includes a plurality of small-area coils.

14. The metal foreign object detection device according to claim 13, wherein the antenna coil includes the small-area coils that are connected in parallel.

15. The metal foreign object detection device according to claim 11, wherein the metal foreign object detection device is arranged in the power supplying device.

16. The metal foreign object detection device according to claim 11, wherein the metal foreign object detection device is arranged in the appliance and transmits a signal of the detection circuit to the power supplying device to control the power supplying device.

17. The metal foreign object detection device according to claim 11, wherein
the appliance includes the antenna coil and the oscillation circuit, and the power supplying device includes the detection circuit, and
the detection circuit includes a receiving antenna coil that receives a signal from the antenna coil of the appliance.

18. The metal foreign object detection device according to claim 11, wherein the antenna coil is arranged on at least one of a power supplying surface, which is formed by a housing of the power supplying device, and a power receiving surface, which is formed by a housing of the appliance.

19. The metal foreign object detection device according to claim 11, wherein an oscillation frequency of the oscillation circuit is higher than an oscillation frequency of the high-frequency inverter.

20. The metal foreign object detection device according to claim 11, wherein the antenna coil is formed to have a spiral shape.

* * * * *